United States Patent
de Melo et al.

(10) Patent No.: US 12,212,628 B2
(45) Date of Patent: Jan. 28, 2025

(54) DOMAIN COMMUNICATION SYSTEM

(71) Applicant: Namecheap, Inc., Phoenix, AZ (US)

(72) Inventors: Rui Rodrigo Cabral Pacheco de Melo, Maia (PT); Nuno Martino do Carmo Meneses Oliveira, Maia (PT); João Henrique Martins Ferreira Guedes, Vila Nova de Gaia (PT); Alexandre Jensen Cunha Neto, Oporto (PT); Manuel Alberto Duarte Soares, Ovar (PT); Bárbara Francisco Sousa Baptista, Mafra (PT); Afonso Vieira Campos Leça Martinho, Oporto (PT)

(73) Assignee: Namecheap, Inc., Phoenix, AZ (US)

( * ) Notice: Subject to any disclaimer, the term of this patent is extended or adjusted under 35 U.S.C. 154(b) by 0 days.

(21) Appl. No.: 17/990,622

(22) Filed: Nov. 18, 2022

(65) Prior Publication Data

US 2023/0164226 A1 May 25, 2023

Related U.S. Application Data

(60) Provisional application No. 63/282,054, filed on Nov. 22, 2021.

(51) Int. Cl.
*H04L 67/141* (2022.01)
*H04L 9/40* (2022.01)
*H04L 67/146* (2022.01)

(52) U.S. Cl.
CPC .......... *H04L 67/141* (2013.01); *H04L 63/102* (2013.01); *H04L 67/146* (2013.01)

(58) Field of Classification Search
CPC ... H04L 67/141; H04L 63/102; H04L 67/146; H04L 67/02; H04L 67/104
See application file for complete search history.

(56) References Cited

U.S. PATENT DOCUMENTS 8,683,043 B1  3/2014 Peters et al.
9,391,949 B1  7/2016 Richardson et al.
(Continued)

FOREIGN PATENT DOCUMENTS

WO   2009047784 A2   4/2009

OTHER PUBLICATIONS

PCT/US2022/050638—International Search Report and Written Opinion dated Mar. 16, 2023, 12 pages.
(Continued)

*Primary Examiner* — Farzana B Huq
(74) *Attorney, Agent, or Firm* — HAYNES BEFFEL & WOLFELD LLP; Andrew L. Dunlap; Jason Liao

(57) ABSTRACT

Systems and methods for conducting direct peer-to-peer real time communications are disclosed. The system comprises a domain communication server. The system includes logic to receive a request on behalf of a first user, to initiate a direct peer-to-peer communication session specifying a domain name of a second user. The second user is a registered and authorized user having the domain name registered with a domain name server and authorized by the domain communication server to participate in the direct peer-to-peer real time communication with other users using the domain name. The system includes logic to offer to the second user based upon the domain name specified in the request, to initiate direct peer-to-peer communications with the first user. The system includes logic to, upon acceptance from the second user, initiate the direct peer-to-peer communication session between the first user and the second user.

19 Claims, 33 Drawing Sheets

(56) References Cited

U.S. PATENT DOCUMENTS

| | | | |
|---|---|---|---|
| 9,813,303 | B1 | 11/2017 | Guigli |
| 2008/0235778 | A1* | 9/2008 | Fratti .................. H04L 63/0869 726/8 |
| 2010/0070569 | A1 | 3/2010 | Turakhia |
| 2011/0044184 | A1* | 2/2011 | Balasaygun .......... H04L 67/306 370/252 |
| 2012/0324113 | A1 | 12/2012 | Prince et al. |
| 2013/0326599 | A1 | 12/2013 | Bray et al. |
| 2014/0181312 | A1* | 6/2014 | Rutten .................. H04L 67/10 709/227 |
| 2015/0067114 | A1 | 3/2015 | Ruggeri |
| 2016/0182441 | A1 | 6/2016 | Gupta et al. |
| 2016/0294768 | A1* | 10/2016 | Khan .................. H04L 67/141 |
| 2017/0093793 | A1 | 3/2017 | Waldron et al. |
| 2017/0195285 | A1 | 7/2017 | Kakhki et al. |

OTHER PUBLICATIONS

Rescorla, E.: "WebRTC Security 1-22 Architecture; rfc8827. txt", Webrtc Security Architecture; rfc8827.txt, Internet Engineering Task Force, IETF; Standard, Internet Society (ISOC) 4, Rue Des Falaises Ch—1205 Geneva, Switzerland, Jan. 19, 2021 (Jan. 19, 2021) , pp. 1-22, XP015143828, Retrieved from the Internet: URL:https://tools.ietf.org/html/rfc8827.
Anonymous: "A Study of WebRTC Security", Sep. 7, 2021 (Sep. 7, 2021), pp. 1-34, XP093029603, Retrieved from the Internet: URL:https://web.archive.org/web/20210907234756/https://webrtc-security.github.io/.
Friese Ingo et al: "Cross-domain discovery of communication peers: Identity Mapping and Discovery Services (IMaDS)", 2017 European Conference On Networks and Communications (EUCNC), IEEE, Jun. 12, 2017 (Jun. 12, 2017), pp. 1-6, XP033122207, DOI: 10.1109/EUCNC.2017.7980642.
Fette, I., et al: "The WebSocket Protocol; rfc6455.txt", The Websocket Protocol; rfc6455.txt, Internet Engineering Task Force, IETF; Standard, Internet Society (ISOC) 4, Rue Des Falaises Ch—1205 Geneva, Switzerland, Dec. 11, 2011 (Dec. 11, 2011), pp. 1-71, XP015081377.
Anonymous: "Domain verification with a TXT Record (alternative method)—Squarespace Help", Jul. 8, 2021 (Jul. 8, 2021), pp. 1-7, XP093029629, Retrieved from the Internet: URL:https://web.archive.org/web/20210708173731/https://support.squarespace.com/hc/en-us/articles/205812388.
PCT/US2022/050638—Second Written Opinion dated Nov. 15, 2023, 9 pages.
Anonymous: "Renewing your domain name", Mar. 1, 2010, pp. 1-4, XP093100027, Retrieved from the Internet: URL:https://web.archive.org/web/20100301125901/https://manage.whois.com/kb/servlet/KBServlet/faq943.html.
PCT/US2022/050638—International Preliminary Report on Patentability dated Feb. 7, 2024, 9 pages.
PCT/US2022/050638—Response to International Search Report and Written Opinion filed Sep. 22, 2023, 18 pages.
GITHUB—Domain-Connect-2.1, v 2.1, revision 57, Mar. 7, 2019, 43pages, [retrieved on Jan. 8, 2021]. Retrieved from the Internet <URL: https://github.com/Domain-Connect/spec/blob/83363c4b4a700d6dae55cdd32bf8d8fd953d79aa/Domain%20Connect%20Spec%20Draft.adoc>.
PCT/US2021/022866—Invitation to Pay Additional Fees and, Where Applicable, Protest Fee, dated Jun. 17, 2021, 9 pages.
EP 21718321.9—First Examination Report dated Sep. 13, 2023, 6 pages.
PCT/US22/50638, Nov. 22, 2022, WO/2023/091770, May 25, 2023.

* cited by examiner

DOMAIN COMMUNICATION SYSTEM

PRIORITY APPLICATION(S)

This application claims priority under 35 U.S.C. § 119(e) to U.S. Provisional Patent Application No. 63/282,054, entitled "DOMAIN COMMUNICATION SYSTEM" filed on Nov. 22, 2021, which application is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE TECHNOLOGY DISCLOSED

The technology disclosed relates generally to domain name systems (DNS), and in particular relates to use of domains for communication.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Public switched telephone network (PSTN) has been in use for more than a century. A traditional PSTN enables a first user to call a second user using a telephone. The telephone call is routed through a public switching exchange. The first user needs to remember the digital phone number of the second user which can be ten digits or more in length. With newer cell phone devices, the users can access a directory to search and call other users. However, traditional telephonic communications have various limitations. For example, it is often difficult to separate the business and personal lines using a single telephone device. For business users, such separation is very useful to attend to the needs of their clients in a timely manner and balance the needs of their business with their privacy. It is also difficult to provide additional features using traditional telephone systems. Features such as call back and knowing the reason of the call can be useful for business owners to efficiently serve their clients. With most businesses using online presence in the world wide web, it is desired to provide a communication solution that can provide a seamless data, voice, and video communication mechanism to domain name owners.

Accordingly, an opportunity arises for the development of a voice communication system that can connect domain owners and/or users of the world wide web to telecommunicate with each other.

SUMMARY

The disclosed technology provides Domain Name based telecommunications with unique identifiers for users using the Domain Name Service (DNS) registry. The technology disclosed includes systems and methods for conducting direct peer-to-peer real time communications. The technology disclosed comprises a domain communication server (DCS) implementing logic for conducting direct peer-to-peer real time communications.

A method implementation of the technology disclosed includes receiving a request on behalf of a first user, to initiate a direct peer-to-peer communication session specifying a domain name of a second user. The second user can be a registered and authorized user having the domain name registered with a domain name server and authorized by the domain communication server to participate in the direct peer-to-peer real time communication using the domain name to conduct the direct peer-to-peer real time communications with other users. If the first user is unauthorized, the method includes, generating for the first user (i) an evanescent domain name registered on behalf of the first user with the domain name server and (ii) an authorization by sending an authorization code to the first user for creating an authorization record with the domain name server. The authorization record includes the authorization code. The method can include authorizing the first user based upon the evanescent domain name, when the authorization code in the authorization record of the first user with the domain name server matches the authorization code sent to the first user. The method can also include generating a call identifier for the direct peer-to-peer communication session between the first user and the second user. The method can further include offering to the second user based upon the domain name specified in the request, to initiate direct peer-to-peer communications with the first user. The offering to the second user can include sending the call identifier to the second user for acceptance of the direct peer-to-peer communication session with the first user and upon an indication of acceptance from the second user, sending the call identifier to the first user. The method can still further include initiating, the direct peer-to-peer communication session between the first user and the second user.

The first user can initiate communications from a first user web page having a domain name registered with the domain name server. The method can further include using the domain name of the first user's web page to conduct the direct peer-to-peer communication session without generating an evanescent domain name for the first user.

The domain name of the second user can be an address string that identifies an Internet Protocol (or IP) resource such as a server to access services provided by the server on behalf of the second user.

In one implementation, the method further includes implementing customer relationship management (CRM) functionality that identifies the first user to the second user based upon the domain name registered with the domain name server and providing to the second user, user information of the first user. The user information can include at least one of a username, user address, date and time of a last communication with the first user, and any products and services purchased by the first user.

The method includes implementing a pre-call assistant that indicates to the second user an intent of the first user's call.

The method includes implementing a pre-call assistant that indicates to the second user a client type of the first user.

The evanescent domain can expire after a pre-defined time duration. The pre-defined time duration can range from ten minutes to 24 hours or even more in some implementations.

One implementation of the method includes the domain communication server removing expired domain name records.

In some implementations, generating the authorization code can further include generating a pseudo-random number.

Various implementations can include capability to conduct telecommunications using one or more of a variety of telecommunication modalities. For example, the request on behalf of the first user can include the request to conduct a voice call. The request on behalf of the first user can include a request to conduct a video call. The request on behalf of the first user can include a request to conduct a data call. The request on behalf of the first user can include a request to conduct messaging. In some implementations, users can select a telecommunications modality from a set of different telecommunications modalities.

In some method implementations, authorizing, by the domain communication server, users to participate in the direct peer-to-peer real time communication using the domain name can further include authorizing users to conduct (i) initiating direct peer-to-peer real time communications; and (ii) receiving direct peer-to-peer real time communications.

In one implementation, the method further includes implementing a schedule function enabling the communications to be scheduled.

In one implementation, the method further includes implementing an Out-of-office mode thereby enabling the second user to establish availability to attend calls.

In one implementation, the method further includes implementing a reward system for users that compensates for the waiting in picking up calls, by tracking wait times using a timer started upon receipt of an incoming call and stopped upon initiating the direct peer-to-peer communication session. The reward system can determine a reward for a waiting user for waiting and provide the reward to the waiting user.

The request on behalf of the first user can be received via a first instance of a web page. In such an implementation, offering to initiate direct peer-to-peer communications with the first user is offered via at least one of: (i) a second instance of a web page and (ii) a first instance of a mobile application.

The request on behalf of the first user can be received via a first instance of a mobile application. In such an implementation, offering to initiate direct peer-to-peer communications with the first user is offered via at least one of: (i) a second instance of a mobile application and (ii) a first instance of a web page.

A data processing system comprising at least one processor coupled with a computer-readable storage medium storing instructions for conducting direct peer-to-peer real time communications is also described herein. The stored instructions when executed by the at least one processor perform the method described above.

A non-transitory computer-readable storage medium storing instructions for conducting direct peer-to-peer real time communications is also described herein. The instructions when executed by at least one processor can execute the method presented above.

Other aspects and advantages of the present invention can be seen on review of the drawings, the detailed description and the claims, which follow.

BRIEF DESCRIPTION OF THE DRAWINGS

The technology disclosed will be described with respect to specific embodiments thereof, and reference will be made to the drawings, which are not drawn to scale, and in which.

DETAILED DESCRIPTION

A detailed description of implementations of the disclosed technology is provided with reference to the FIGS. 1-16.
Introduction A Domain Name System is used conventionally on the Internet to provide a naming convention for locating IP-based computers. The generalized DNS model includes a distributed database system for managing host names and their associated Internet Protocol (IP) addresses. A single server might be responsible for knowing host names and IP addresses for a small part of a zone, but DNS servers can together map all domain names to the IP addresses. DNS implements a hierarchical naming system called the domain namespace.

Domain names can abstract numbers, IP addresses, etc. into concepts. Domains can also abstract or/and render obsolete phone numbers. A domain name can be an identifier (or ID) on which an audio/multimedia communication channel is open between two, or more users.

With domains, users can create an online presence, claiming the ownership of an address. This online presence is safe, borderless, preserves individual privacy and grants independence and control. These attributes can be provided by embodiments of the described technology, further some embodiments can enable other functionalities and/or enhance existing functionality. The domain communication system (also referred to as a domain voice call system) establishes calls through a unique ID using a novel proprietary DNS.

The technology disclosed provides systems and methods for direct peer-to-peer real time communications using domain names. The technology disclosed comprises a domain communication server (DCS) that implements logic to receive a request for initiating and establishing a direct peer-to-peer communication between at least two users. The DCS can receive a request from a first user to initiate a direct peer-to-peer communication session with a second user. The request can include a domain name of the second user. The DCS can send the request to the second user and upon acceptance of the request from the second user, establish a direct peer-to-peer communication session between the first user and the second user.

Both the first user and the second user are registered with a domain name server for participating in the direct peer-to-peer communication using domain names. An evanescent domain name can be registered by the technology disclosed on behalf of a user of the peer-to-peer communication system when that user does not have a registered domain name. The evanescent domain name expires after a pre-defined time duration such as ten minutes, one hour, twelve hours or more.

Environment

Figure 1:
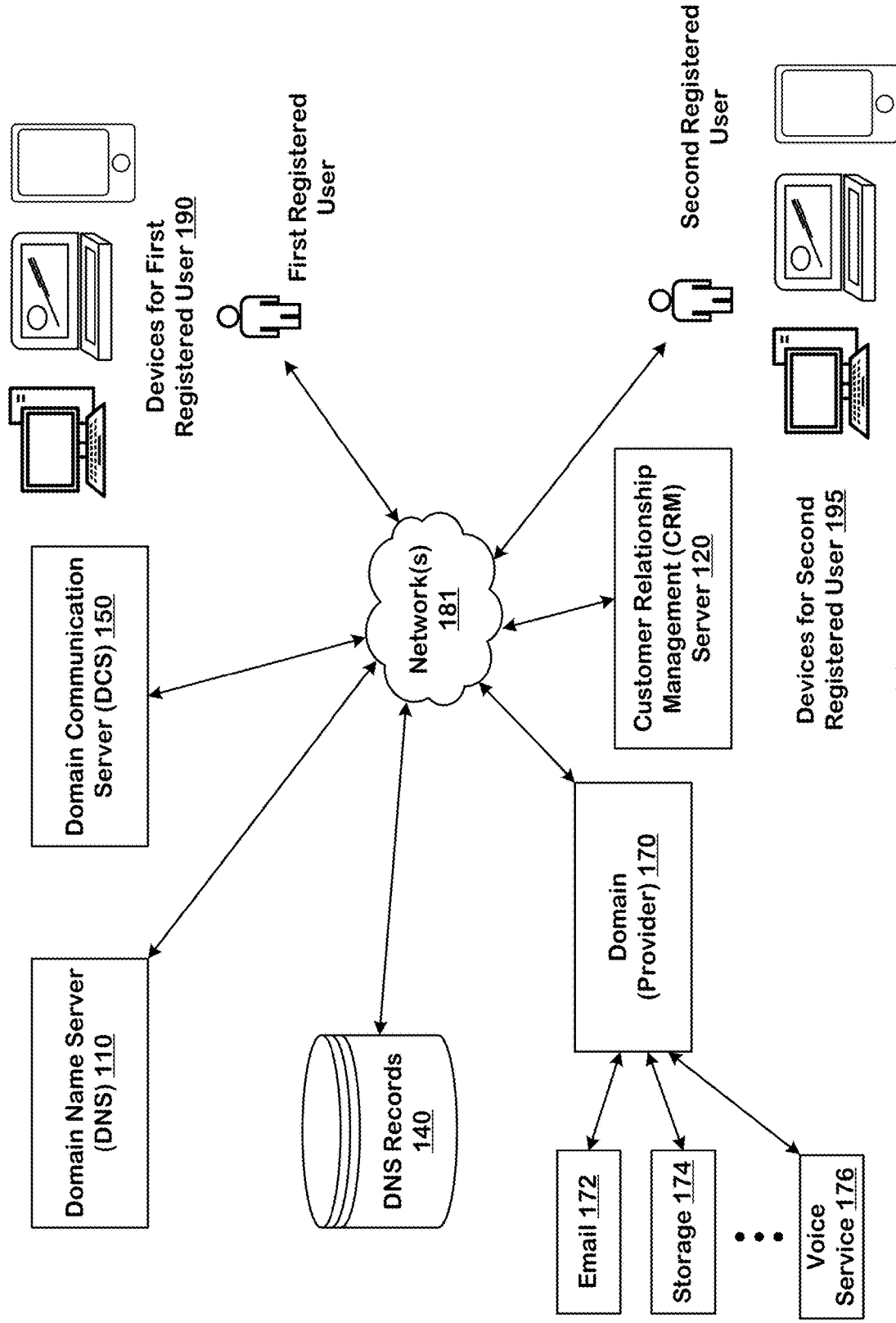
FIG. 1 is a simplified diagram of an environment implementing the technology disclosed for conducting direct peer-to-peer real time communications using the domain communication server.

We describe a system for conducting direct peer-to-peer real time communications, comprising a domain communication server (DCS). FIG. 1 is a simplified diagram of one environment of the system in accordance with an implementation. Because FIG. 1 is an architectural diagram, certain details are intentionally omitted to improve the clarity of the description. The discussion of FIG. 1 is organized as follows. First, the elements of the figure are described, followed by their interconnection. Then, the use of the elements in the system is described in greater detail.

FIG. 1 includes the system comprising a domain name server 110, a customer relationship management (CRM) server 120, DNS records 140, a domain communication server (DCS) 150, a domain 170, a network(s) 181, a first registered user 190 with access to one or more computing devices, and a second registered user 195 with access to one or more computing devices. The domain 170 can have various Internet (or digital) services such as an email 172, a disk storage 174, and a voice service 176 associated with it.

A DNS Server 110 can store information to resolve the request to access a domain 170 from a computing device connected to the network. We have shown only one server representing the domain name server for simplifying the illustration. It is understood that more than one server can be used in a distributed manner to respond to queries for resolving domain names.

FIG. 1 shows a DNS domain 170 with an email 172, a disk storage 174 and a voice service 176 associated with it. There may be other internet services associated with the DNS domain 170 not shown in the figure. To resolve domain names, the DNS servers access their zones. The zones contain resource records. A DNS records database 140 can be used to store resource records. The resource records contain information associated with the DNS domain. For example, some resource records map friendly names to IP addresses, others map IP addresses to friendly names, resource records can indicate services, products or plugins associated with a domain name.

The system of FIG. 1 provides a new communication technology (including voice and video calls and data messaging) based on domain that can be used by users such as the first registered user to make a telephone call to the second registered user in a direct peer-to-peer manner without using PSTN exchange. The domain communication server (DCS) 150 implements logic to receive a request on behalf of the first user 190, to initiate a direct peer-to-peer communication session with the second user 195. The first user 190 can initiate this request from any one of the devices such as a desktop computer, a laptop computer, a tablet, a cell phone, etc. Both the first user 190 and the second user 195 have their respective domain names registered with the domain name server (DNS) 110. The technology disclosed includes logic to detect whether a user is registered with the domain name server or not. If the user is not registered with the domain name server i.e., the user does not have a domain name registered with the domain name server then the domain communication server 150 initiates generation of an evanescent domain name registered on behalf of the user with the domain name server 110. The evanescent domain name expires after a pre-defined time duration such as 10 minutes, one hour, 6 hours, 12 hours or more.

The first user 190 and the second user 195 also need to be authorized by the domain communication server 150 to participate in the direct peer-to-peer communication session. If a user is not authorized, the domain communication server 150 can initiate the authorization for the user by sending an authorization code to the user for creating an authorization record with the domain name server 110. The authorization record includes the authorization code. The domain name server 110 can authorize the first user 190 based upon the evanescent domain name or a regular domain name, when the authorization code in the authorization record of the user 190 with the domain name server 110 matches the authorization code sent to the user 190.

When both the first user 190 and the second user 195 are registered with the domain name server 110 and authorized by the domain communication server 150, the domain communication server 150 can generate a call identifier for the direct peer-to-peer communication session between the first user and the second user. The domain communication server 150 then offers, to the second user 195 based upon the domain name specified in the request, to initiate direct peer-to-peer communications with the first user 190. The offer includes sending the call identifier to the second user 195 for acceptance of the direct peer-to-peer communication session with the first user 190. Upon an indication of acceptance from the second user 195, the domain communication server sends the call identifier to the first user 190. The domain communication server 150 then initiates the direct peer-to-peer communication session between the first user 190 and the second user 195.

The technology disclosed can implement the customer relationship management (CRM) server 120 including logic that identifies the first user 190 to the second user 195 based upon the domain name registered with the domain name server 110. The CRM 120 functionality can provide to the second user 195, user information of the first user 190. The user information can include at least one of a username, user address, date, and time of a last communication with the first user, and any products and services purchased by the first user. The technology disclosed can implement a pre-call assistant that indicates to the second user 195 a client type of the first user 190. Examples of the type of clients (or customers) can include a new customer, a repeat customer, a premium customer, etc. Additionally, the business can define several categories of their customers based on the membership levels, subscription levels or other criteria. The pre-call assistant can help the businesses to provide the service level commensurate with the membership or subscription level. The pre-call assistant includes logic to indicate to the second user an intent of the first user's call. The technology disclosed includes logic to define calling user's intent based on the needs of the business (i.e., the second user or the called user). For example, for a photography business, examples of intents can include "product photography," "event photography," "print order," "order complaint," "information request," etc. The intent can help the called user to provide better service to the calling user.

The technology disclosed can provide several unique voice call features that are not provided by many traditional telephone-based voice communication systems. The Domain Communications Server 150 can provide an Out-of-office mode for businesses to establish the availability to attend calls. The pre-call assistant can include options that will inform the user (or business owner) what type of call their client is making. For example, the business can find out if an incoming call is related to a new order, an existing order, a complaint, or just to get information about their products or services. The system can create a reward mechanism to compensate users that are waiting in the queue to be connected. The system can provide a callback feature that provides intelligent information to the business before connecting the business to the user.

The technology disclosed provides a telephone communication system that is versatile in terms of the types of devices and platforms. For example, the users can use desktop computers, laptop computers, mobile devices, cell phones, smart watches or types of computing devices to make and receive calls. The receiving user (or business) can know if the call is important for their business using pre-call assist feature in which the calling user has indicated the purpose of their call. The technology disclosed allows the users to make and receive calls on multiple devices using a browser or an app. Therefore, the technology disclosed provides an omnichannel platform for users to connect to each other in a peer-to-peer manner.

The technology disclosed provides additional services to their users which enables them to seamlessly integrate voice calls in their web-based business presence such as their web pages (or websites), or apps, etc. The technology disclosed provides templates for websites. The technology disclosed provides a customer relationship management tool to manage call time with clients and differentiate between types of clients that are calling their business. The technology disclosed provides the option for users to communicate through different formats such as audio, video, text messages, etc. The technology disclosed can also be used to establish direct peer-to-peer communication between users with Handshake (HNS) domains <<handshake.org>>. HNS is a decentralized, peer-to-peer naming protocol that provides an alternative to centrally managed top-level domains like .COM, .GOV, etc. Handshake decentralizes the process of applying, creating, and managing top level domains.

Completing the description of FIG. 1, the components of the system, described above, are all coupled in communication with the network(s) 181. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. We now provide further details of the process to establish domain voice calls. The following section presents an example of the direct peer-to-peer communication between the first registered user and the second registered user. Two use cases are presented to further illustrate the direct peer-to-peer communication between the first user and the second user.

Example of Direct Peer-to-Peer Communication

A process is described to establish a voice and/or a video call between the first registered user 190 and the second registered user 195 using the domain communication system. The first registered user 190 can send a call request to a uniform resource location or a URL to the domain name of the second registered user 195. For example, the second registered user's domain name can be "phone.secondUser.work." The call to this domain name is resolved by the domain name server 110 which resolves the requested URL to find the location of the second user's computing device. If the second user 195 has multiple devices, the call can be routed to browsers in multiple devices linked to the second user. Note that this URL is unique and therefore, the call is only directed to the second registered user who has registered this name with the domain name registration service. One person, or one business can have multiple domain names for receiving different types of calls. For example, one domain name can be associated with new orders, another domain name can be registered with service calls, a third domain name can be registered to receive complaints, a fourth domain to provide reviews for the produces or services etc. Thus, the technology disclosed can provide segmentation for businesses to receive calls on a given domain name for a particular business segment or a particular business function, etc. The user may have to allow the browser via making adjustments in the settings to make or receive calls. The calls in the domain communication system are sent to a browser and therefore, there is no requirement for the computing device to have a SIM card or a traditional phone number to make or receive a call. Any Internet-enabled device with a browser can make and receive domain-based voice, video calls and text messages. Two use cases of domain-based voice and video calls are presented below. These uses cases are presented to show selected features of domain communication system.

Use Case 1: A user wants to start a voice call to a business, e.g., a gym, with the following name: "easy.training". This user just has to type "easy.training" on his application keypad instead of the business's phone number e.g., +14155552671. The domain name is easier remembered than a phone number. This provides value by using the domain name as the unique ID to be shared to contact this business Use Case 2: A user wants to start a voice call to a business, a restaurant. Once he starts this call it is possible to segment what specifically he wants to achieve, e.g., "order a pizza" or "complaint" or "other". If his call is not picked up, he can then choose a schedule to be contacted back. The technology disclosed can therefore reduce time and resources on a call and provide actionable feedback when for some reason a connection is not established. This provides value by always keeping the user engaged with a possible outcome that meets the user's expectations.

Figure 2A:
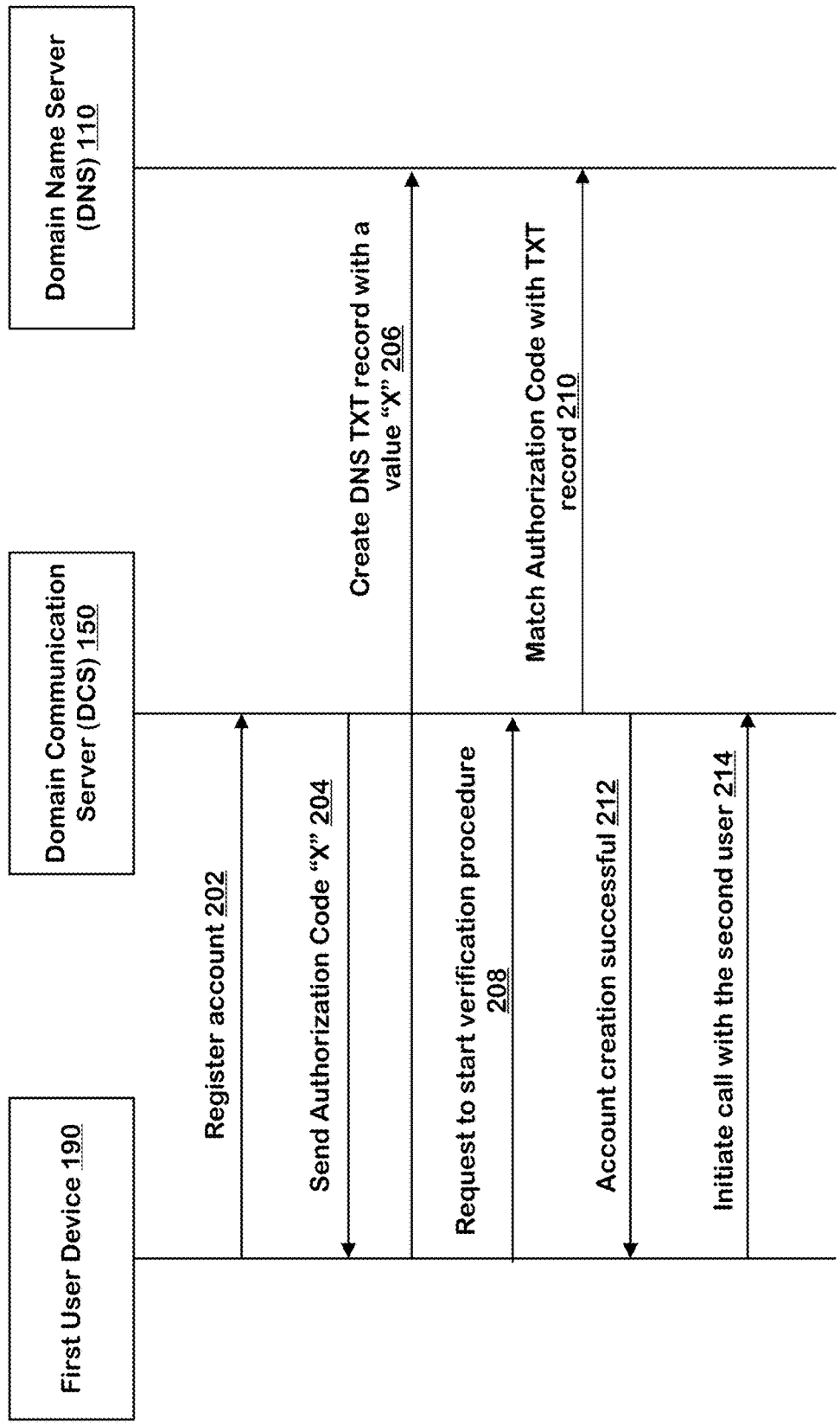
FIGS. 2A and 2B present message sequence diagrams illustrating messages sent between users, the domain communication server and the domain name server for establishing direct peer-to-peer communication between the users.
Figure 2B:
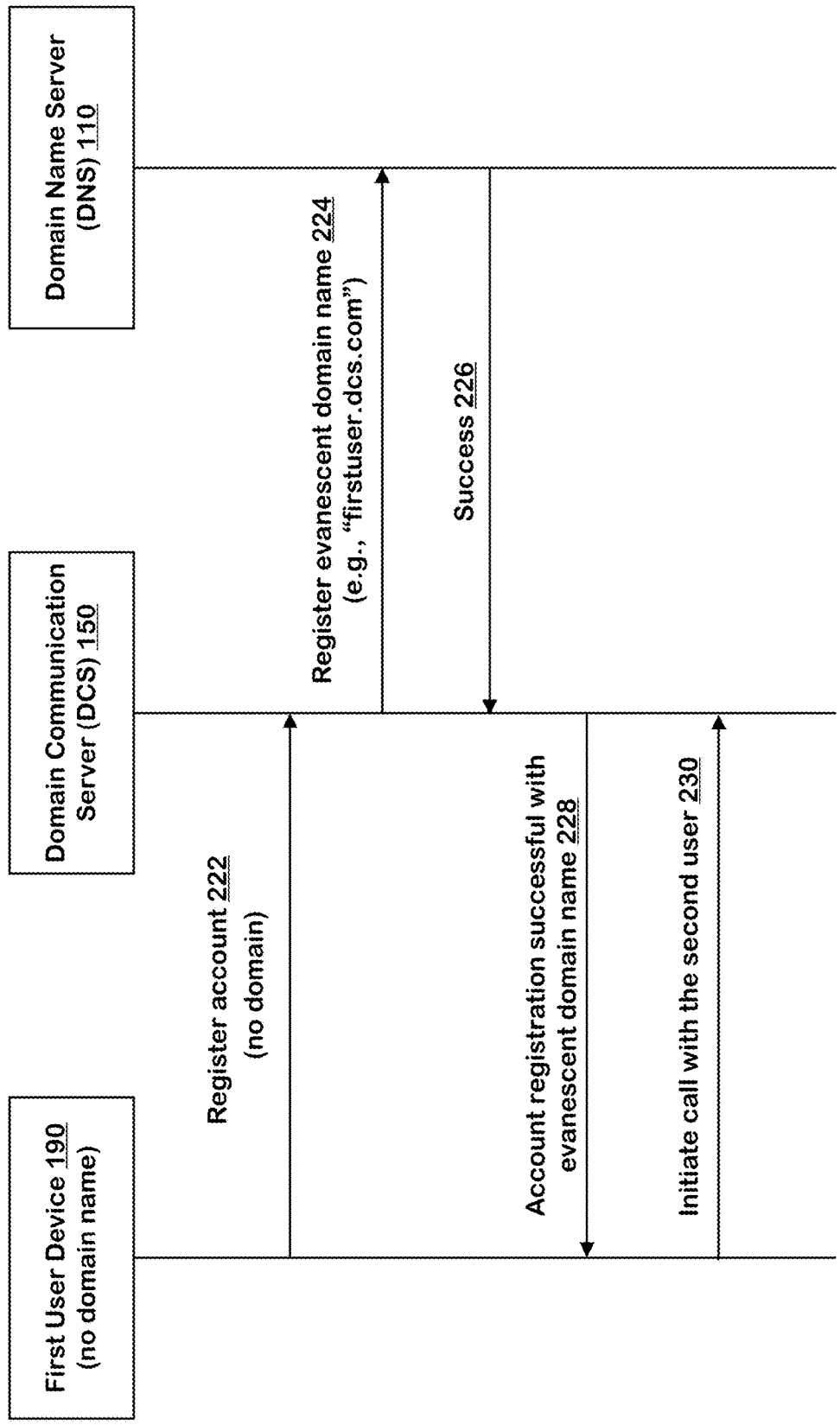

FIGS. 2A and 2B present message sequence diagrams illustrating message communication between various system components of the technology disclosed to initiate and establish direct peer-to-peer communication between the first user and the second user. FIG. 2A presents a message sequence diagram illustrating the registration and authorization process when the first user device 190 initiating the request for a call has a domain name registered with the domain name server 110. FIG. 2B presents a message sequence diagram illustrating the registration and authorization process when the first user device 190 initiating the request for a call does not have a domain registered with the domain name server 110.

FIG. 2A presents communication between three actors, the first user device 190, the domain communication server 150 and the domain name server 110. The message sequence is performed when the first user device 190 has a domain name registered with the domain name server 110. The first user device 190 sends a register account message 202 to the domain communication server 150. The register account message 202 can include the domain name of the first user 190. The domain communication server 150 sends an authorization code "X" in a message 204 to the first user device 190 in response to the register account message 202. The first user device stores the authorization code "X" in a TXT record in their respective domain name record accessible to the domain name server 110 (via a message 206). The authorization code can be a random number or a random alpha numeric string generated by the domain communication server 150 for verification of the first user's domain name during the registration process. The technology disclosed can use an existing random number generation algorithm to generate the authorization code "X". An example random number generation algorithm used by the technology disclosed is the Universally Unique Identifier or UUID v4 algorithm. Further details of the UUID v4 algorithm are available at <<datatracker.ietforg/doc/html/rfc4122>>.

Resource Records are sets of information in the DNS records database 140 that can be used to process client queries. Each DNS server contains the resource records it needs to answer queries for the portion of DNS namespace for which it is authoritative. A DNS server is authoritative for a contiguous portion of the DNS namespace if it contains information about the portion of the namespace. Resource records are used to store data about domain name and IP addresses. A resource record specifies information about a domain such as an IP address, a mail server receiving email for the domain, mapping of an alias domain name to a canonical (true) domain name, etc. TXT records are multipurpose records that can be used to store machine readable and human readable data. TXT records can be used to store various types of information such as domain ownership verification data, contact details, data related to email spam prevention, framework (SPF) policies, etc.

The first user device 190 sends a request to start verification procedure to domain communication server 150 in a message 208. The domain communication server 150 matches the authorization code that it sent to the first user in the message 204 with the code stored in the TXT record accessible to the domain name server 110 (message 210). When the authorization code is matched, the domain communication server 150 sends account creation success message 212 to the first user device 190. Upon receiving the success message, the first user device 190 can initiate the call with the second user device 195 by sending an initiate call with the second user message 214.

FIG. 2B presents communication between three actors, the first user device 190, the domain communication server 150 and the domain name server 110 when the first user does not have a domain name registered with the domain name server 110. The first user device 190 sends a register account message 222 to domain communication server 150. The message may not include any domain name as the first user does not have a domain name registered with the domain name server 110. The domain communication server 150 includes the logic to process the message 222 and determine that the first user needs to have an evanescent domain name registered with the domain name server to establish the direct peer-to-peer communication between the first user device 190 and the second user device 195. The domain communication server 150 sends a register evanescent domain name message 224 to the domain name server 110. In one implementation, the domain communication server 150 can request creation of an evanescent subdomain such as "firstuser.dcs.com". In other implementations, the domain communication server 150 can register an evanescent domain such as "firstuser.com" or "tempfirstuser.com", etc. The evanescent domain or the evanescent subdomain is created for a short duration of time and expires after the predetermined duration, e.g., ten minutes, one hour, 3 hours, 12, hours, one day, etc. The domain name server 110 sends a success message 226 to the domain communication server 150 upon creation of the evanescent domain or the evanescent subdomain for the first user 190. The domain communication server 150 sends an account registration successful message 228 to the first user. The message 228 can also include the evanescent domain name or the evanescent subdomain name created by the domain communication server 150 on behalf of the first user device 190. Upon receiving the account registration success message 228, the first user device 190 can initiate the call with the second user device 195 by sending an initiate call with the second user message 230. In the following sections, further examples of direct peer-to-peer communication between the first user and the second user are presented.

Domain Communication System

Figure 3A:
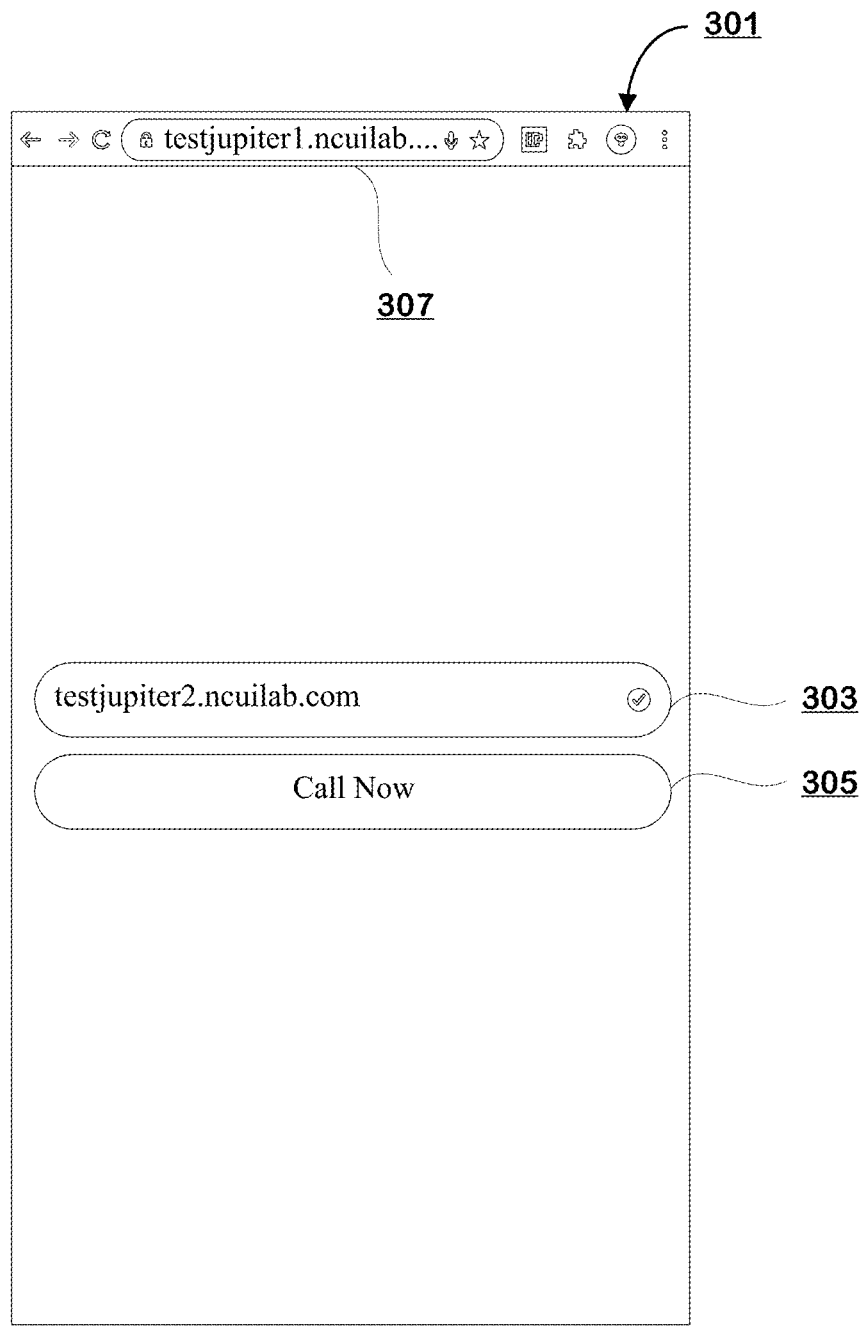
FIGS. 3A, 3B, 3C and 3D present examples of user interfaces that can be used to implement the technology disclosed to establish direct peer-to-peer real time communications between two users.
Figure 3B:
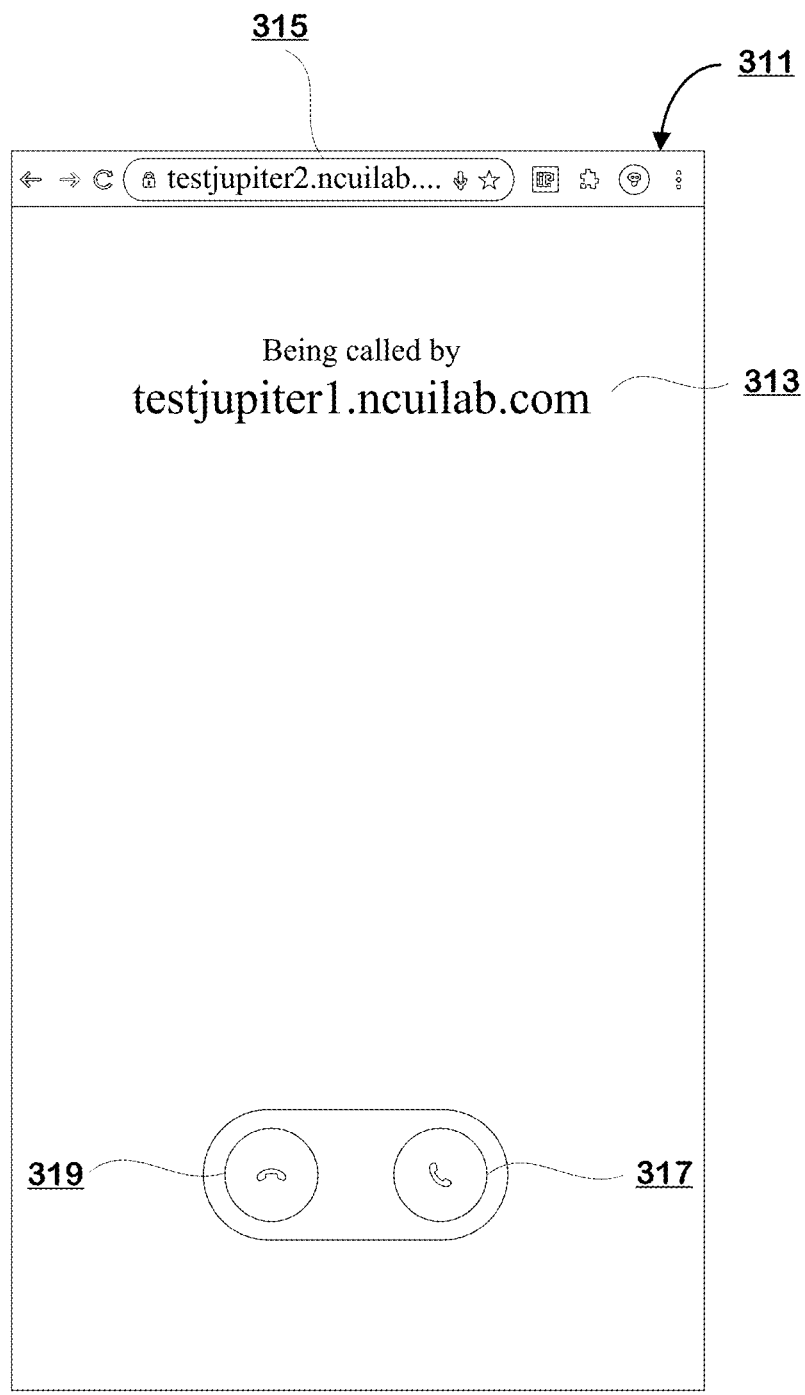
Figure 3C:
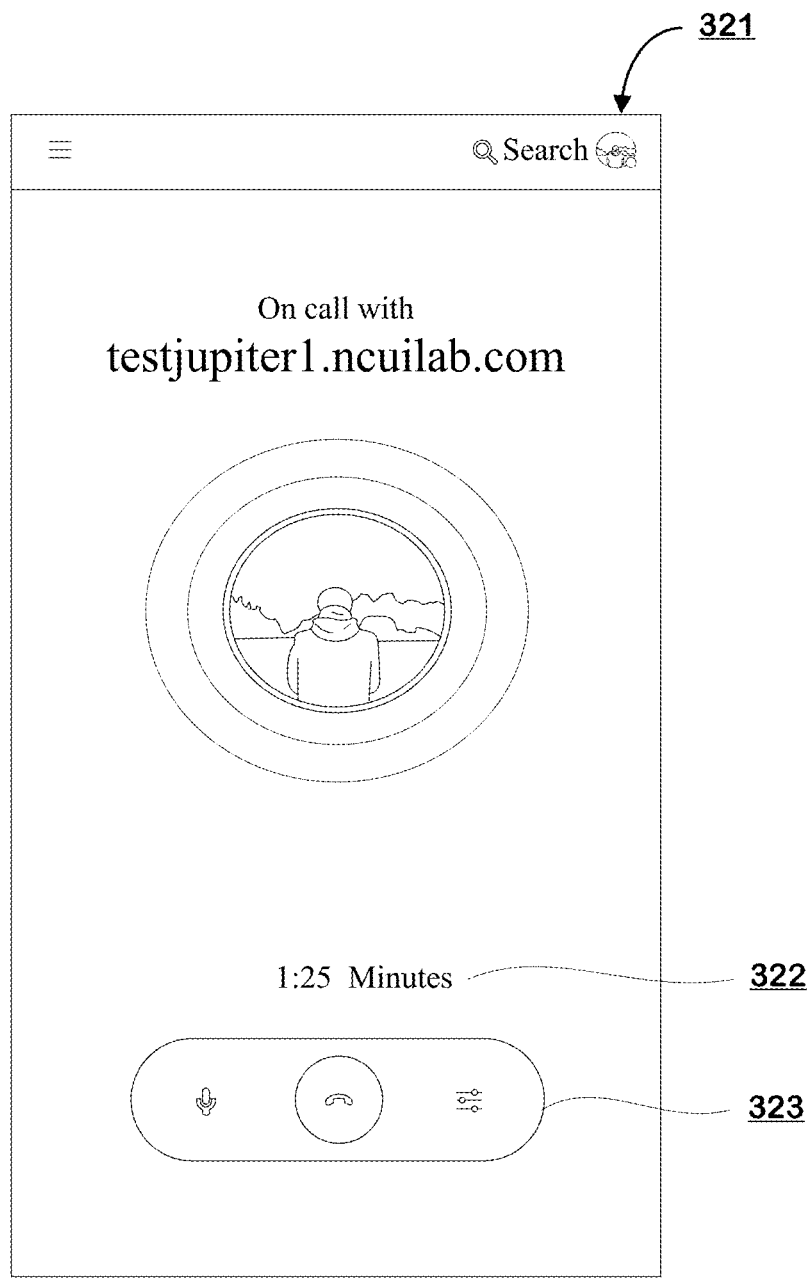
Figure 3D:
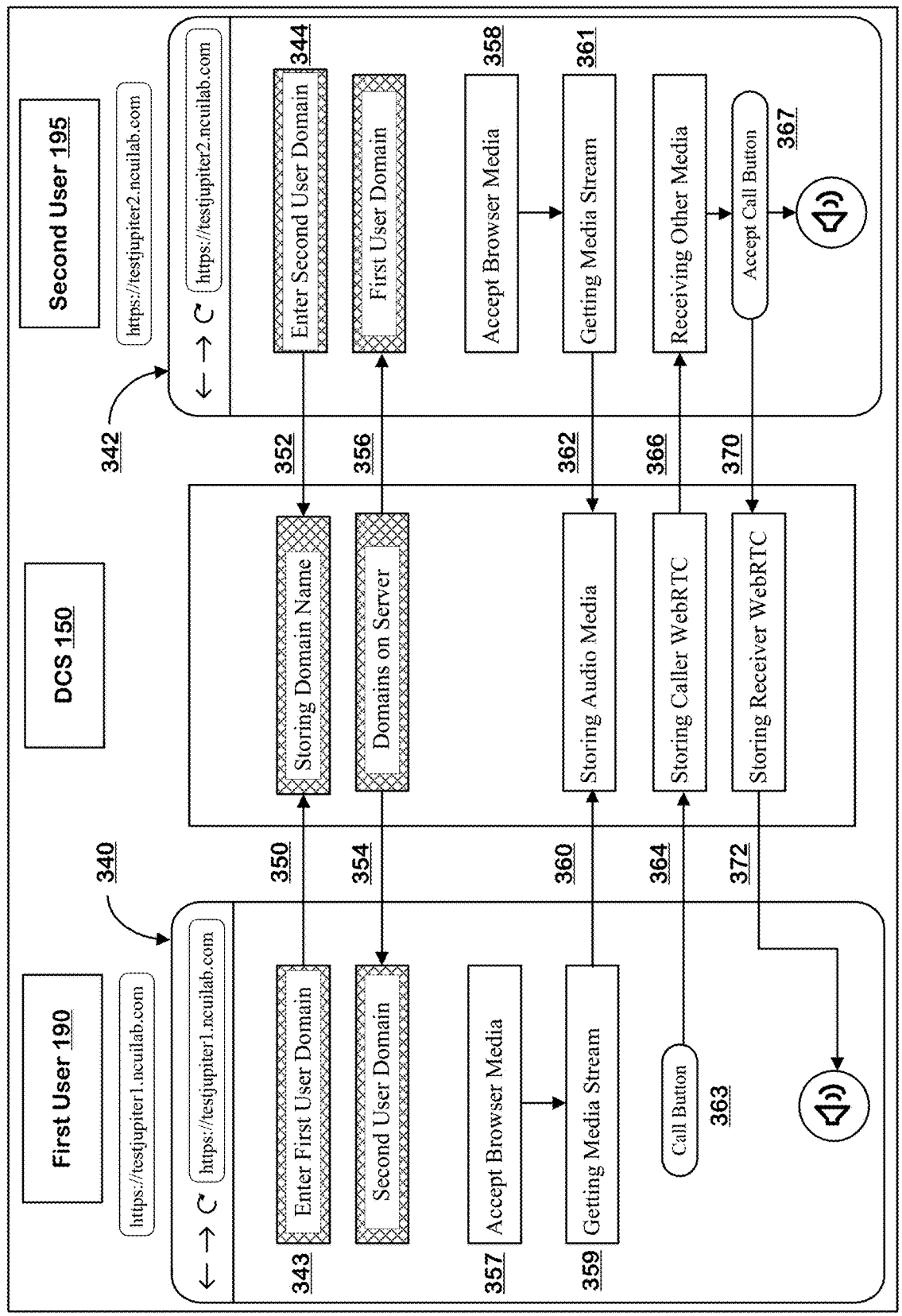

This section describes the operations performed by two users to establish direct peer-to-peer real time communication using the domain communication server. FIGS. 3A, 3B and 3C present actions performed by two users on their respective web pages or apps running on mobile devices to initiate the direct peer-to-peer call. FIG. 3D presents an architecture of the domain communication system and the interactions between the various system components. The system components can include the backend (e.g., the domain communication server) and the frontend (e.g., the web page or an app running on a mobile device) of the domain communication system as shown in a message sequence diagram in FIG. 3D.

Calling Flow

FIGS. 3A, 3B and 3C present an overview of both "sides" of the application (caller side and called/receiver side). As presented above, the domain communication system's frontend can be similar on both sides (i.e., first user's device 150 and second user's device 190) so that the user can receive and make calls using a registered domain. In this section we further illustrate the operations of domain communication system as a bidirectional channel between the two or more users for establishing direct peer-to-peer communications.

FIG. 3A presents a user interface 301 of the app running on a mobile device serving as the first user device 190. The first user device 190 can receive the first user's selection of the domain name of the second user using a user interface element 303. The first user device 190 can then receive the first user's selection of a button 305 to initiate a call to the second user 195. The URL pointing to the domain name of the first user 190 is displayed in an address bar user interface element 307.

FIG. 3B shows a user interface 311 of the domain communication system app running on the mobile device of the second user 195. The second user's device 195 receives an incoming call notification or an alert on the app. The incoming call notification on the second user's mobile device 195 can include the domain name 313 of the first user calling the second user. The technology disclosed includes call assist feature which can also display a reason of the call on the second user's mobile device such as "product query", "service request", "new order", etc. The domain name of the second user 195 is also displayed on the user interface 311 in the user interface element 315. The second user's device 195 can accept the call from the first user's device 190 by selecting the user interface element 317 or reject the call from the first user's device 190 by selecting the user interface element 319.

FIG. 3C shows a user interface 321 on the second user's mobile device 195 during the call with the first user 190. The second user's device 195 can receive user selection of the user interface elements 323 to hang up the call, mute the microphone during the call, etc. A call duration can be displayed on the user interface 312 indicating the amount of time the second user is on the call with the first user (322). The following sections present further details of the process for setting up the domain data for the two users and then establishing the call using the domain data. The process of setting up the domain data and establishing the call is described in four steps.

FIG. 3D presents a message sequence diagram illustrating communication between the first user's device 190 and the domain communication server 150 and between the second user's device 195 and the domain communication server 150. In this example, two technologies are used to implement the functionality provided by the domain communication server (DCS). These two technologies are WebRTC and Socketio. It is understood that other technologies can be used to implement the technology disclosed. We present brief details of these two technologies in the following sections.

WebRTC (Web Real-Time Communication) provides browsers and mobile applications with Real-Time Communications (RTC) capabilities via application programming interfaces (APIs). It enables audio and video communication to work inside web pages by allowing direct peer-to-peer communication, eliminating the need to install plugins or download native apps. The white cards (with no cross-hatch pattern) in the FIG. 3D represent WebRTC features. Further details of establishing peer-to-peer connections using WebRTC is available at <<webrtc.org/getting-started/peer-connections>>. Real-time communication capabilities can be added to an application using WebRTC. It supports video, voice, and generic data to be sent between peers, allowing developers to build powerful voice- and video-communication solutions. The technology is available on all modern browsers, as well as on native clients for all major platforms. The technologies behind WebRTC are implemented as an open web standard and available as regular JavaScript APIs in all major browsers. For native clients, like Android and iOS applications, a library is available that provides the same functionality. Further details about WebRTC technology are available at <<webrtc.org>>.

Socket.IO is a library that enables real-time, bidirectional and event-based communication between the browser and the server. The cards (or boxes) with cross-hatch pattern in FIG. 2C represent socket.IO features. The client can establish a WebSocket connection. WebSocket is a communication protocol which provides a full-duplex and low-latency channel between the server and the browser. Further details of socket.io library is available at <<socket.io/docs/v4>>.

The technology disclosed can provide a web page, a portal or an app where the users can enter their respective domain names for participating in direct peer-to-peer communication. FIG. 3D shows that the first user 190 and the second user 195 enter their respective domain names via an app running on their respective mobile devices 340 and 342. In the example shown in FIG. 3D, the first user's domain name is <<testjupiter1.ncuilab.com>> and the second user's domain name is <<testjupiter2.ncuilab.com>>. The components 343 and 344 receive the domain the respective domain names of the first user and the second user for further processing. The first user's domain name is sent to the domain communication server in a message 350 and the second user's domain name is sent to the domain communication server in a message 352. When a user needs to make a direct peer-to-peer call to another user, the domain communication server 150 can provide the domain names of other user via the app or the web page. For example, the domain communication server provides the second user's domain name to the first user's device 190 in a message 354. Similarly, the domain communication server provides the first user's domain name to the second user's device 195 in a message 356. A user registered with the domain communication server can then make a direct peer-to-peer call by selecting a domain name of the other user as provided by the domain communication server 150. The domain communication server 150 can provide a list of domain names of other users who are registered with the domain communication server 150 for participating in a direct peer-to-peer communication. The first user's device 190 and the second user's device 195 can then access WebRTC functions to communicate with the domain communication server 150 (messages 360 and 362 respectively). The first user can then initiate the call to the second user by clicking on the "call" button 363 which causes the first user's device 190 to send a message 364 to the domain communication server. The domain communication server 150 can store the caller information and send a message 366 to the second user's device 195. The user interface of the mobile device of the second user then displays an "accept call" button 367. A ringer tone or other types of signals may also be generated to indicate to the second user 195 that the first user 190 is calling the second user 195 in a direct peer-to-peer communication. The second user 195 can then select the "accept call" button to receive the call and start communicating with the first user. A message 370 is then sent to the domain communication server 150 indicating the second user 195 has accepted the call. The domain communication server 150 sends a message 372 to the first user's device 190 indicating that the second user has accepted the call. Following this, the two users can communicate with each other using their respective computing or mobile devices in a direct peer-to-peer communication. Further details of the system components and communication between the components is presented below.

The Backend (Domain Communication Server)

In order to establish peer-to-peer communication between two different domains, the technology disclosed includes a centralized server such as the domain communication server 150 which functions as a "bridge" between these two channels. In one implementation, the technology disclosed can use ExpressJS server using Socketio connections to listen for events triggered by the users. The events triggered can, for instance, include the "call" and the "hangup" requests. To check for the triggered (or fired) event, the technology disclosed can use the centralized server such as the domain communication server (DCS) 150. In one implementation, the DCS 150 is not only a Socketio event manager but also a place to store selected domains and communication data.

The Frontend (Web Page or App)

The other side of the domain communication system consists of a front-end of the application which can be a web page or an app running on a mobile device. In one implementation, the web page or the app running on the mobile device can include the registered users' information that a user can call using the domain communication system. The list of registered users can include uniform resource locators (URLs) or links to their respective web pages that the user can call and receive calls from via their respective domain names. In one implementation, the web pages can be built using ReactJS library and provide features to the users so that they can start and receive calls. Other technologies can be used to implement the back end and frontend functionalities of the technology disclosed. In one implementation, the front-end of the system is visible in multiple devices and the user can initiate calls and receive calls in through one of the devices. The following sections present four steps for implementing direct peer-to-peer real time communications between users.

Step 1: Setting Up the Data

The first step involves setting up the domains for the users to participate in the direct peer-to-peer communication. For example, the respective domains of the first user 190 and the second user 195 in the example presented above are <<https://testjupiter1.ncuilab.com/>> and the <<ttps://testjupiter2.ncuilab.com/>>. The operations 343 and 344 comprise data setup in which the users via their respective computing or mobile devices provide their respective domain names to the domain communication server 150. If a user does not have a domain name registered with the domain name server 110 then the technology disclosed enables the user to register a domain name prior to establishing direct peer-to-peer communication. An evanescent domain can also be setup for the purpose of domain communication. The evanescent domain expires after a predetermined time duration.

Figure 4A:
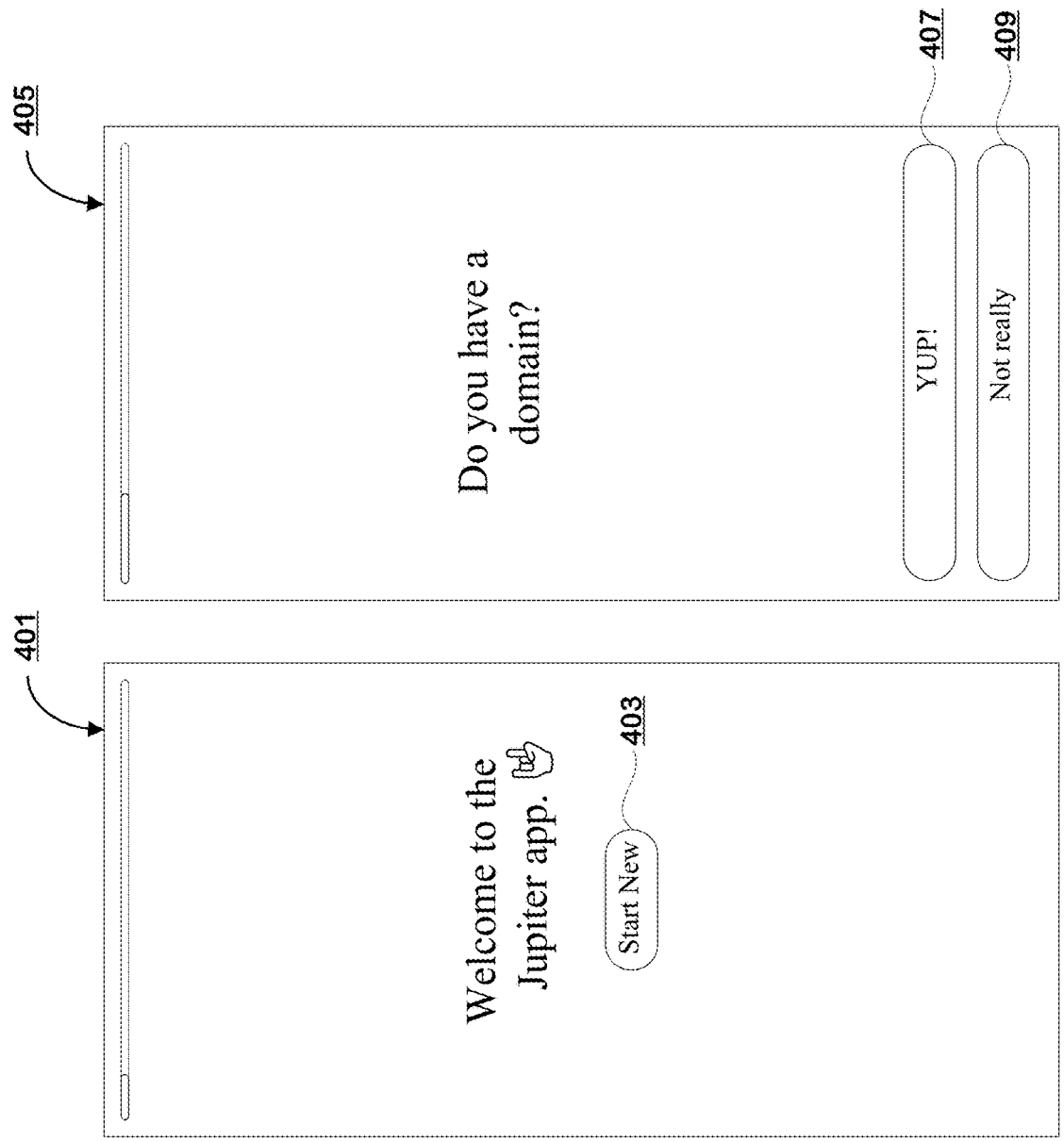
FIGS. 4A and 4B present examples of an app that can be used to establish direct peer-to-peer real time communications between two users.
Figure 4B:
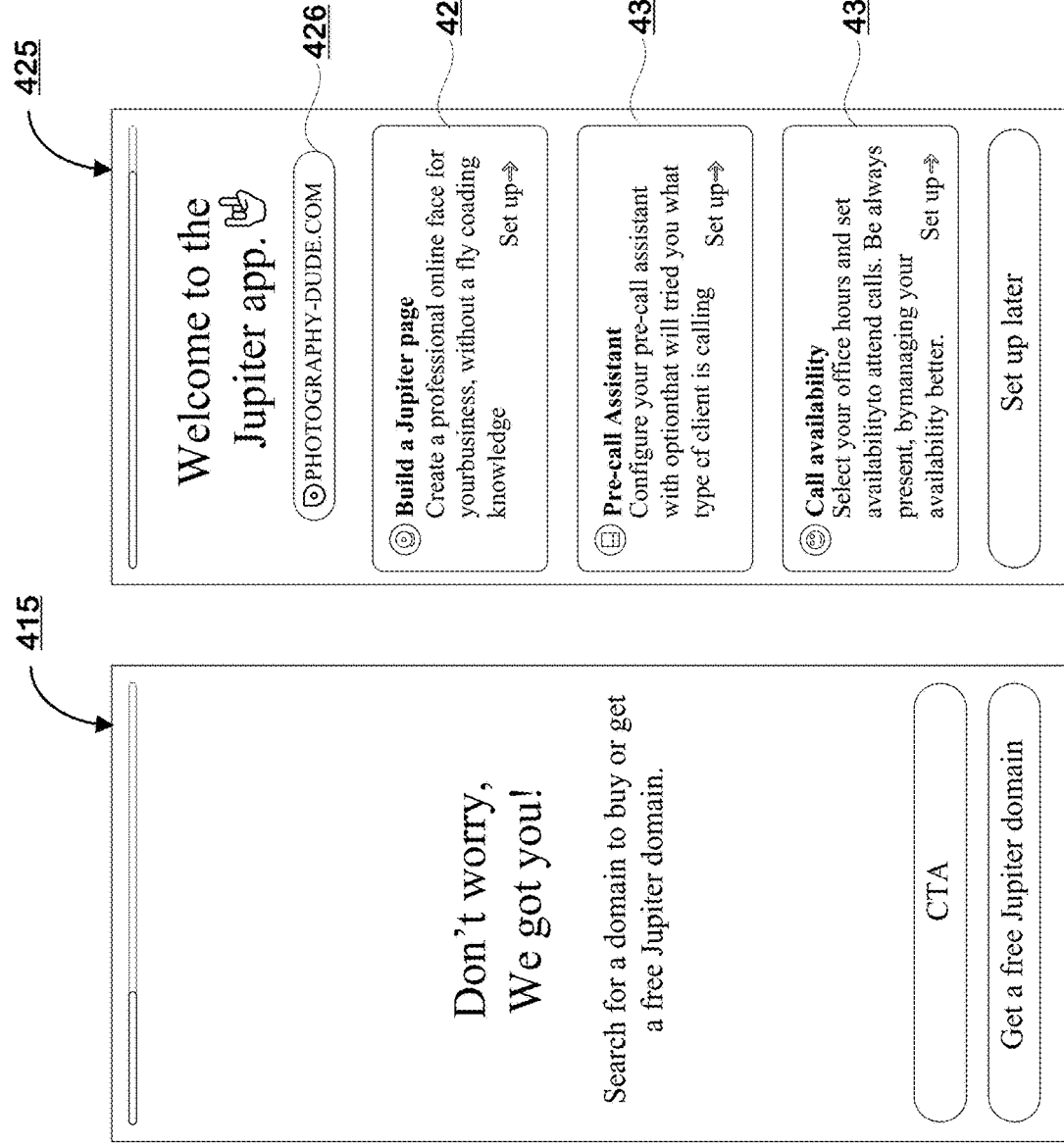

FIGS. 4A and 4B present user interfaces to register a domain name with a domain name server 110 using a mobile app implementing the domain communication system. The user interface 401 invites a new user to start using the domain communication system for direct peer-to-peer communication. When the user selects a user interface element 403, a next user interface 405 is presented to the user. If the user already has a domain name registered with the domain name server, then the user can select a user interface element 407 otherwise, the user can select a user interface element 409. If the user selects the user interface element 409, a next user interface 415 is presented to the user to purchase a domain name or get a free domain name for a trial period as shown in FIG. 4B. When the user selects the option to get a free domain for a trial period, the mobile app presents a user interface 425. The user can select a domain name from drop down menu in a user interface element 426 or enter a desired domain name as a text in the user interface element 426. The user can select additional products such as building a web page for the registered domain (427), including a pre-call assistant (432), including call availability option (437) etc.

Step 2: Establishing a Direct Peer-to-Peer Connection

Figure 5A:
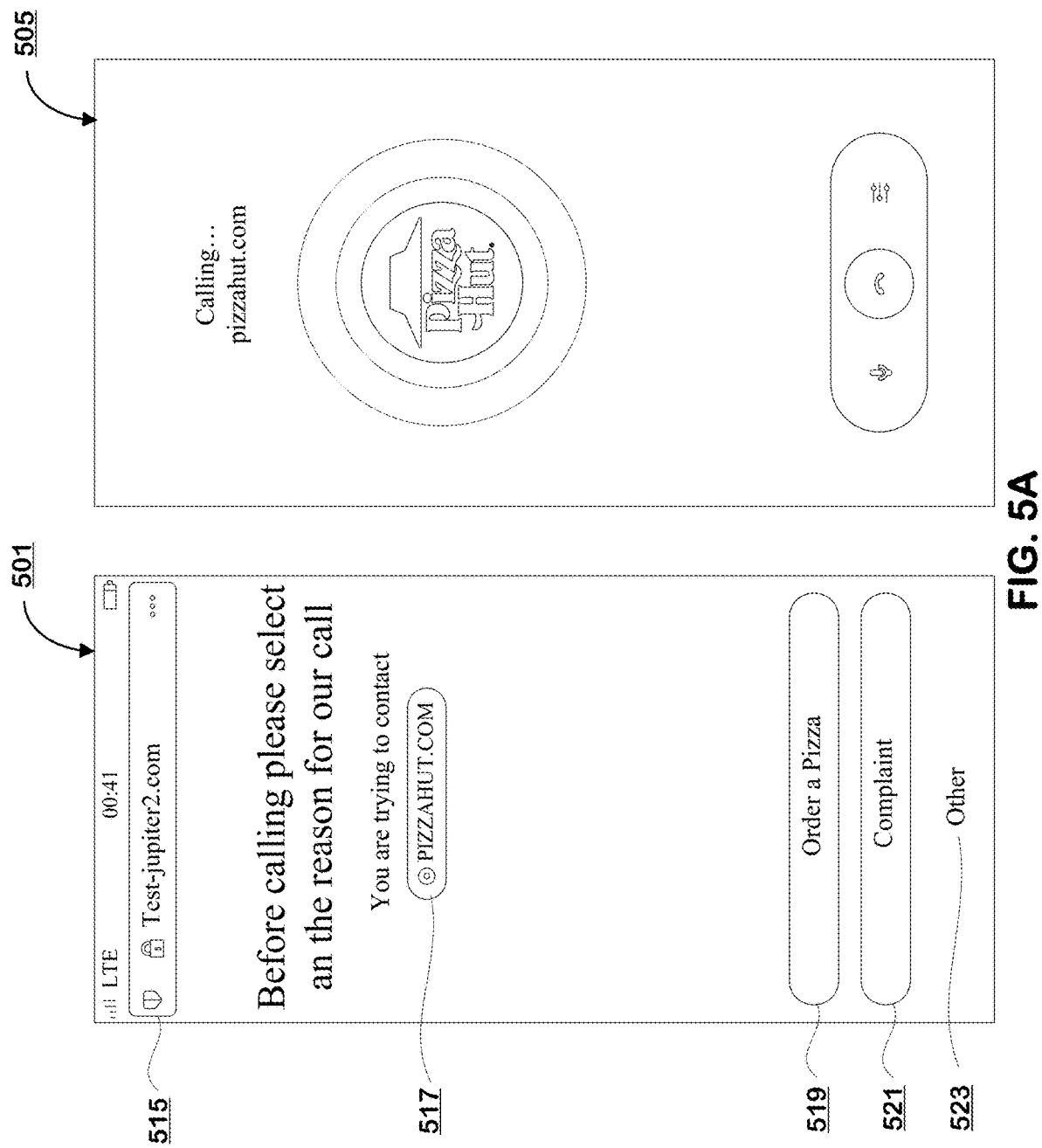
FIGS. 5A and 5B present an example of a call assist functionality implemented by the technology disclosed including call back feature.
Figure 5B:
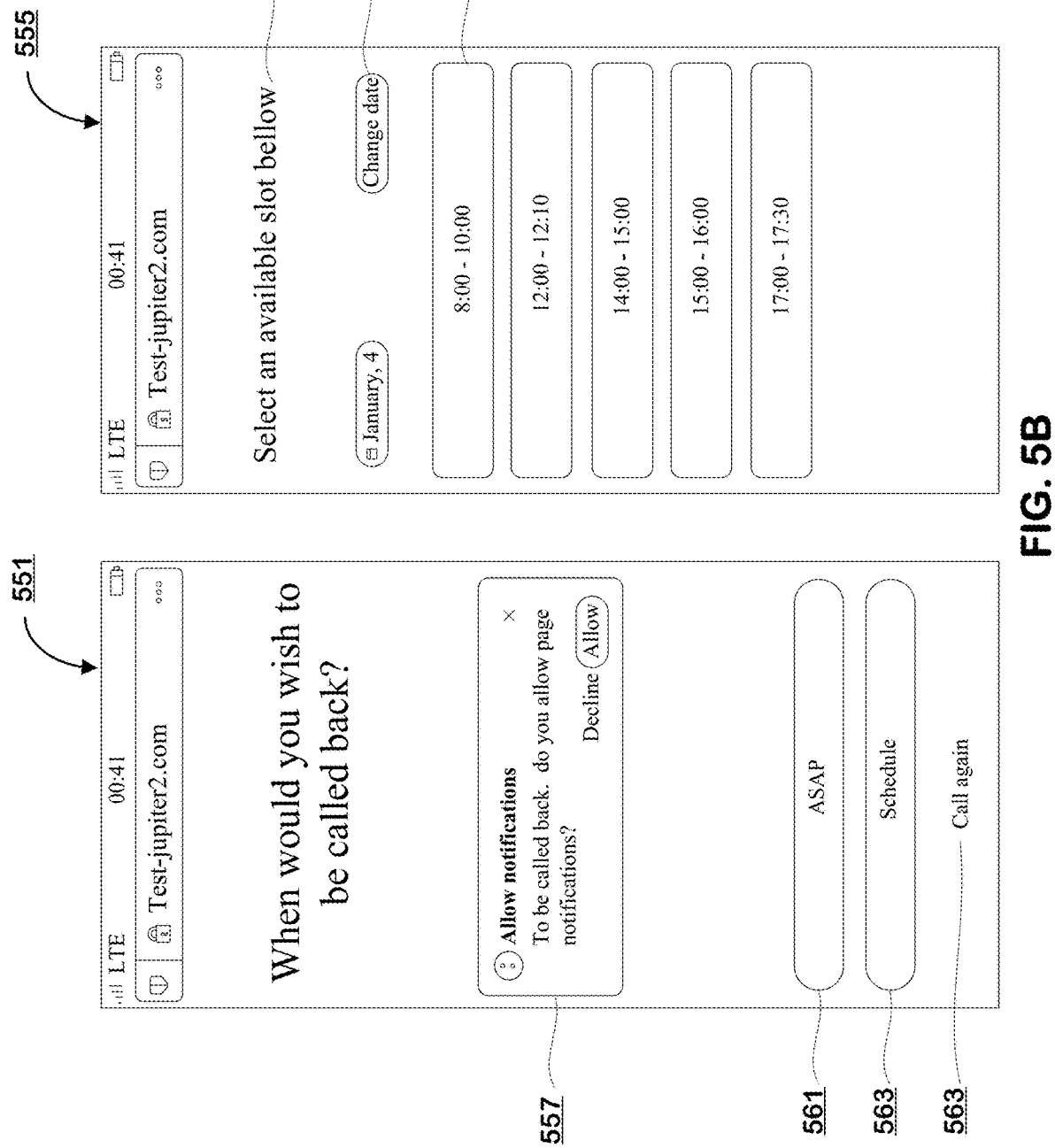

FIGS. 5A and 5B present an example for establishing a direct peer-to-peer connection using the domain communication server 150. The illustration 501 presents a user interface of the domain communication system app running on a mobile device. The caller can use the app to initiate the direct peer-to-peer communication. The caller's domain name is presented in a user interface element 515. The caller can enter the name of the user with whom she wants to communicate or select the names of a user from a list of users provided by the app. The user interface element 517 presents the domain name of the user whom the caller wants to communicate with. The user interface can present additional call assist features available for the call. For example, user interface elements 519 and 521 present two call assist options, labeled respectively as, "order a pizza", and "complaint". When the caller selects any one of the user interface elements 519 or 521, the user at the receiving end can receive additional information about the reason of the call. The caller can select "other" option 523 if the options listed above do not match the reason for the call. An illustration 505 presents an example user interface when the call is initiated by the first user.

When a user selects one of the call options listed above, the web page or the app automatically initiates a Socketio event to the centralized server sending the current domain that the user is in. The server is always listening for new connections, so it receives these domain data and attaches the current Socket connection ID to it. This ID is the unique identifier of the WebSocket created and the main connection variable. This will generate a server data variable with all the domains and the respective connections IDs currently active.

We present below, an example of server domain data variable:

```
const domainsActive={
  'https://testjupiter1.ncuilab.com/':'12F452'
  'https://testjupiter2.ncuilab.com/':'22345J'
};
```

We can see in the above example that the server "maps" all domains with the current connection ID so that the socket can communicate properly. After that, the domain communication server 150 sends an event to all the domains that are active with these variables so that the front-end of the system can know which domains are available for direct peer-to-peer communication. The available domains are then listed in the "type the domain" field 303, as shown in FIG. 3A. If the user has typed an active domain in this field, the "Call Now" button 305 appears as shown in FIG. 3A.

When the user enters the domain communication system portal or app, there can also be a media request initiated from the browser or the app requesting for microphone permissions for communication. After the user accepts the permissions (operations 357 and 358 in FIG. 3D), the front end of the system stores the media stream object in a variable (operations 359 and 361 in FIG. 3D). This media stream object contains all the media data (in the case of an audio call it contains audio data) so that the user can send his microphone input audio. In the case of a video call, the media stream object contains the video and audio media data. At this point the system is all set to start a direct peer-to-peer call request. The peer-to-peer call or peer-to-peer communication can also be referred to as a domain-to-domain call or a domain-to-domain communication.

When the user selects the "Call" or "Call Now" button on the web page or the app running on a mobile device, the following operations are performed by the technology disclosed to establish direct peer-to-peer communication between the calling user and the called user.

The computing device running the web page or the app creates a peer object (such as WebRTC peer object) that contains the caller media stream. A signal event is sent to the domain communication server 150 including the message that the domain (caller's domain name) wants to call the other domain (the called user's domain name). This event can send additional data to the domain communication server 150 including the domain the user wishes to call, the WebRTC caller signal and the media stream object, etc. This signal can contain all the (WebRTC) communication data needs to establish the communication such as a voice or a video call.

The domain communication server 150 receives this data from the calling user's computing device and establishes the direct the peer-to-peer communication of the calling user with the called user using the domain name of the called user. The domain communication server 150 receives the called domain from the caller and with the domain data variable created in the beginning gets the call identifier (socket ID) associated with it. The server then uses this call identifier (or socket ID) to establish the communication with the called user having the domain name matching the domain name in the signal received from the caller.

The domain communication server 150 sends a message (labeled 366 in FIG. 3D) including an event to the called/receiver domain indicating that the calling user wants to connect with called user and that the calling user waiting for a response. This event sends the domain, the WebRTC communication signal and the media stream object of the caller to the receiver (called user or called domain).

In the receiver domain, the "being called" event is triggered. The front-end stores all the incoming data and a receiving call screen appears as shown in FIG. 3B.

When the user selects the answer call button, the web page or the app creates a receiver peer object that sends the "accept call" event to the server with his media stream and the respective communication signal. This event is then received in the server, and Socketio sends the media stream object and the communication signal back to the caller via messages 370 and 372 as shown in FIG. 3D.

At this point a "handshake" is created between these two peers (represented by their respective domain names). With this handshake, the domain communication server 150 is able to get all the information needed to establish the peer-to-peer connection and the audio media stream flow between these two domains.

For example, the domain communication server gets the current data from the caller and the receiver including:
Domain and Socketio ID (used to communicate and see who's active)
Media stream object (the data the contains the microphone and/or camera input)
Communication signal (object that contains the WebRTC communication session)

Step 3: Embedding the Streaming Audio

Now that front-ends on computing devices or mobile devices of both users have the media stream object of the other peer, the technology disclosed adds them to an audio HTML element so that the browser can emit sound in case of an audio call. To achieve this, the domain communication server 150 embeds that media stream inside an empty audio HTML tag. This can be achieved by the following code:
audioElement.current.srcObject=props.streamObject;

The above code shows that the audio element that is in the HTML will be populated with the peer stream object received by the server. After this the user can now listen to the other domain microphone input in real time. This results in a screen like shown in FIG. 3C. The duration of the call can also be displayed as shown by the user interface element 322 in FIG. 3C.

Step 4: Hanging Up the Call

When one of the users selects the "hang up" button (as shown in user interface element 323 in FIG. 3C), the Socketio connection is closed on that user's computing device. Following this, an event is triggered on the domain communication server 150 to send the other domain that information as well. The "hang-up" event is then fired in the other domain, and the computing device closes the Socketio connection from this end as well. When the Socketio connection is ended, the domain communication server returns to the "call a domain" screen, and the user can start above-described process again to establish another direct peer-to-peer communication.

Features of the Domain Communication System

The technology disclosed provides a communication service (also referred to as a Domain Communication System) that uses a domain as the calling contact. The technology disclosed can be applied to existing domains as well as new ones. By using a domain as an ID for communication, instead of conventional numbers, users can benefit in multiple ways:
Domains can be personalized, and so people can introduce intention into how a domain is registered.
Users already use words to create other forms of identification, by doing the same with how they communicate, the experience is greatly improved.
Words are easier to memorize and, when put together, can create meaning, contrary to what numbers are as an ID. For example, when people want to save someone's phone number, they add a name to make it memorable.

The calling function can be triggered by one of the following ways:
Adding "/call" on any domain that has the system implemented, followed by the search on any browser;
Clicking on a link that leads to a domain with a "/call" extension (and has the system implemented);
Clicking on the call button on any website page that has the system implemented;
Searching for a domain on the proprietary software or platform;
Saving as a calling contact on a digital device;
Receiving a push call notification and accepting the request to answer;

In one implementation, the calling user or the caller may not have a domain registered with the domain name server 110 to call a domain. In this implementation, the domain communication server 150 can generate an evanescent domain name for the caller. The evanescent domain name expires after a pre-determined time duration. In one implementation, the caller remains anonymous if he wishes to, maintaining his privacy throughout the entire process of calling.

In case the caller also has a domain with the service implemented, she can be identified by the domain being called, if the user wishes to. Also, in this case, the domain can be added as a contact. The domain can be used as a calling service by multiple users, in this case one of the users can be identified as the "Administrator" of the service.

The calling procedure can have a pre-call assistant with predetermined choices for the caller to identify its intentions. In case the call does not occur (because the domain being called was offline or did not pick the call), the caller can choose between sending a request for calling "as soon as possible" or sending a suggested schedule for a future call. The user of the domain communication system can introduce extra (possibly useful) information to any contact after each call.

Types of Communication Using Domain Communication System

The technology disclosed allows three types of communication: voice, video, and message (such as text message). The type of communication is only limited by the type of device being used on both ends, and/or limited by the preference of each side.

Channels of Communication Using Domain Communication System

The technology disclosed provides an omnichannel solution, and can be used on all devices that have an internet connection and a minimum interface of a microphone. As demonstrated by the following use cases, we will focus on the most common interfaces which use a screen. For this, we have two types of solution, a browser-based interface, and the App. All the features are available on both interfaces, but the app needs to be installed.

Mobile App

The technology disclosed can be implemented using an app running on a mobile device. For example, FIGS. 5A, 5B, 6A and 6B present user interface examples for a mobile app implementation of the domain communication system (DCS).

Desktop Web App

Figure 6:
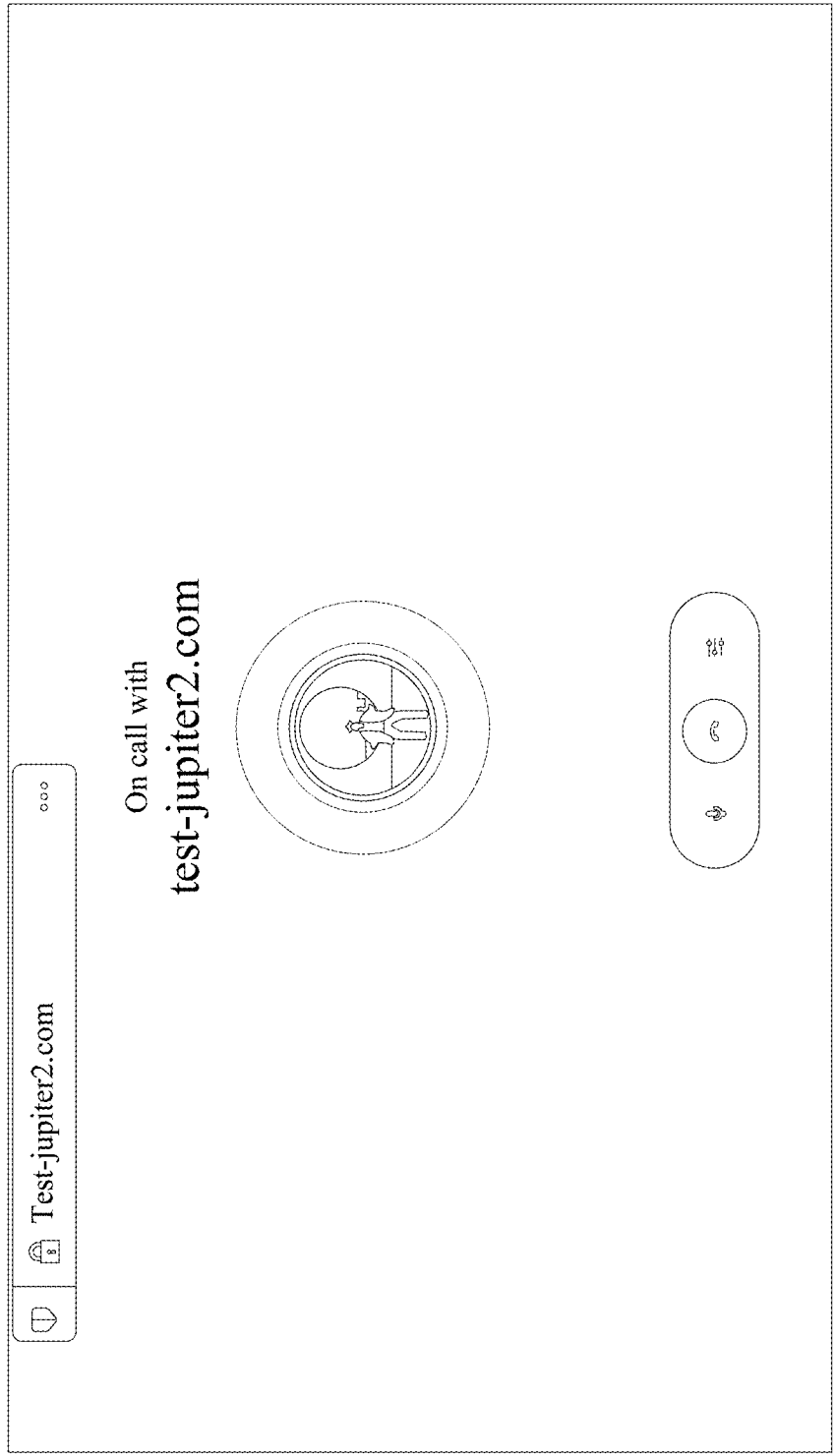
FIG. 6 presents a user interface for a desktop application implementing the domain communication system disclosed herein.

The technology disclosed can be implemented using a desktop web app implementation. For example, FIG. 6 presents a user interface for a desktop application implementing the domain communication system.

Example Use Cases for Domain Communication System

We present various use cases of direct peer-to-peer communication using domain communication system. The use cases are organized in two categories. The first category of use cases is related to calling user (or caller side use cases) and the second category of use cases is related to called user (or called side use cases).

The calling user uses cases include extension-to-call, click-to-call, schedule a callback, select a call reason before calling and search services contacts. It is understood that other uses cases of the calling user are possible. The above-listed use cases are presented as examples to illustrate the functionality of the domain communication system.

The called user use cases include receiving push notification on the phone or other computing devices, receiving ring on the phone, receiving call on a desktop/laptop/tablet computer, receiving pre-call information, receiving schedule information, back office receiving call and redirecting to a team member, receiving message with a callback request. It is understood that other uses cases of the of the called user are possible. The above-listed use cases are presented as examples to illustrate the functionality of the domain communication system.

Calling User or Caller Side Use Cases

Further details of the calling user or caller side use cases are presented below.

Extension-to-Call

Figure 7A:
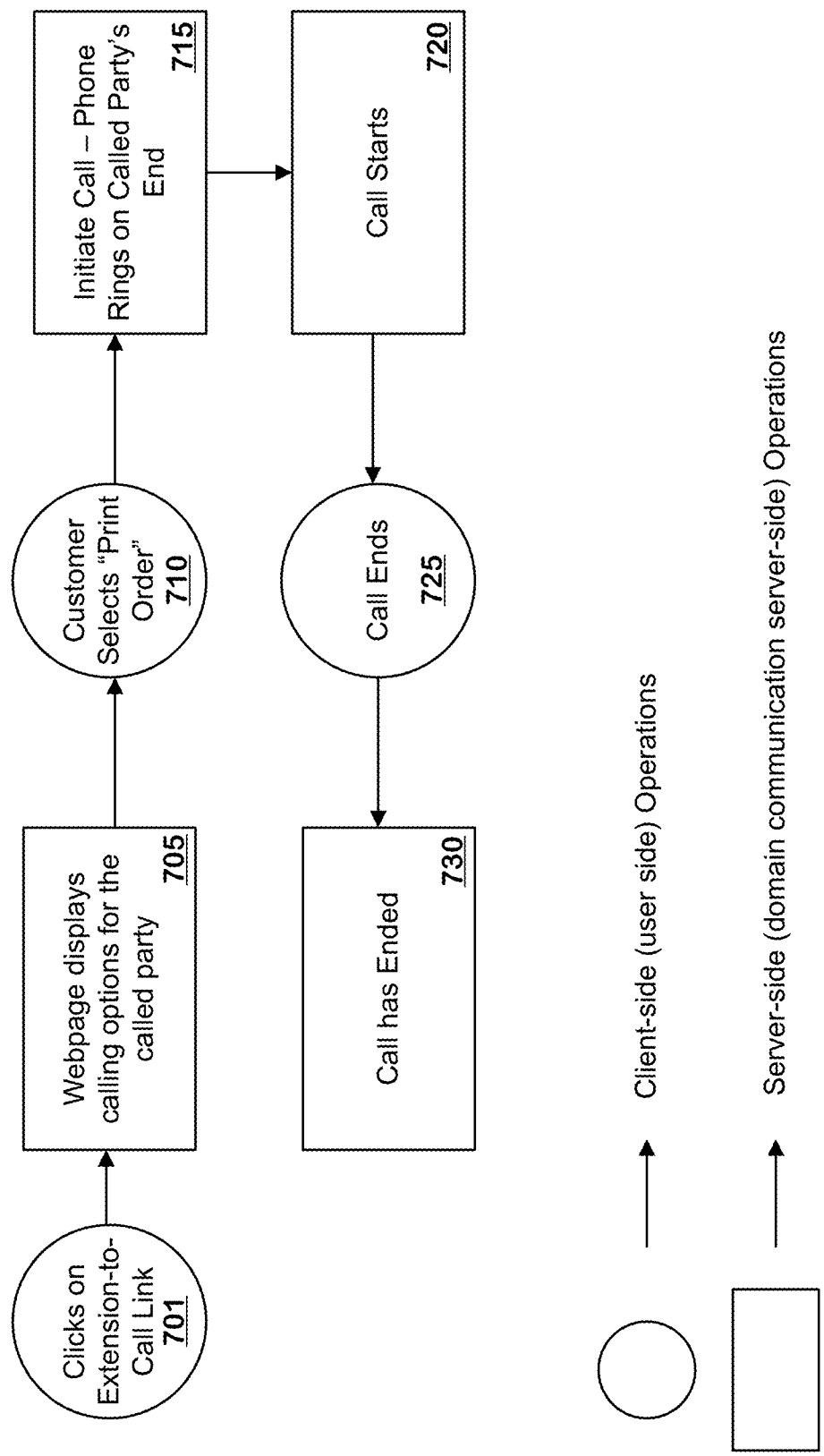
FIGS. 7A and 7B present an extension-to-call use case for the calling user.
Figure 7B:
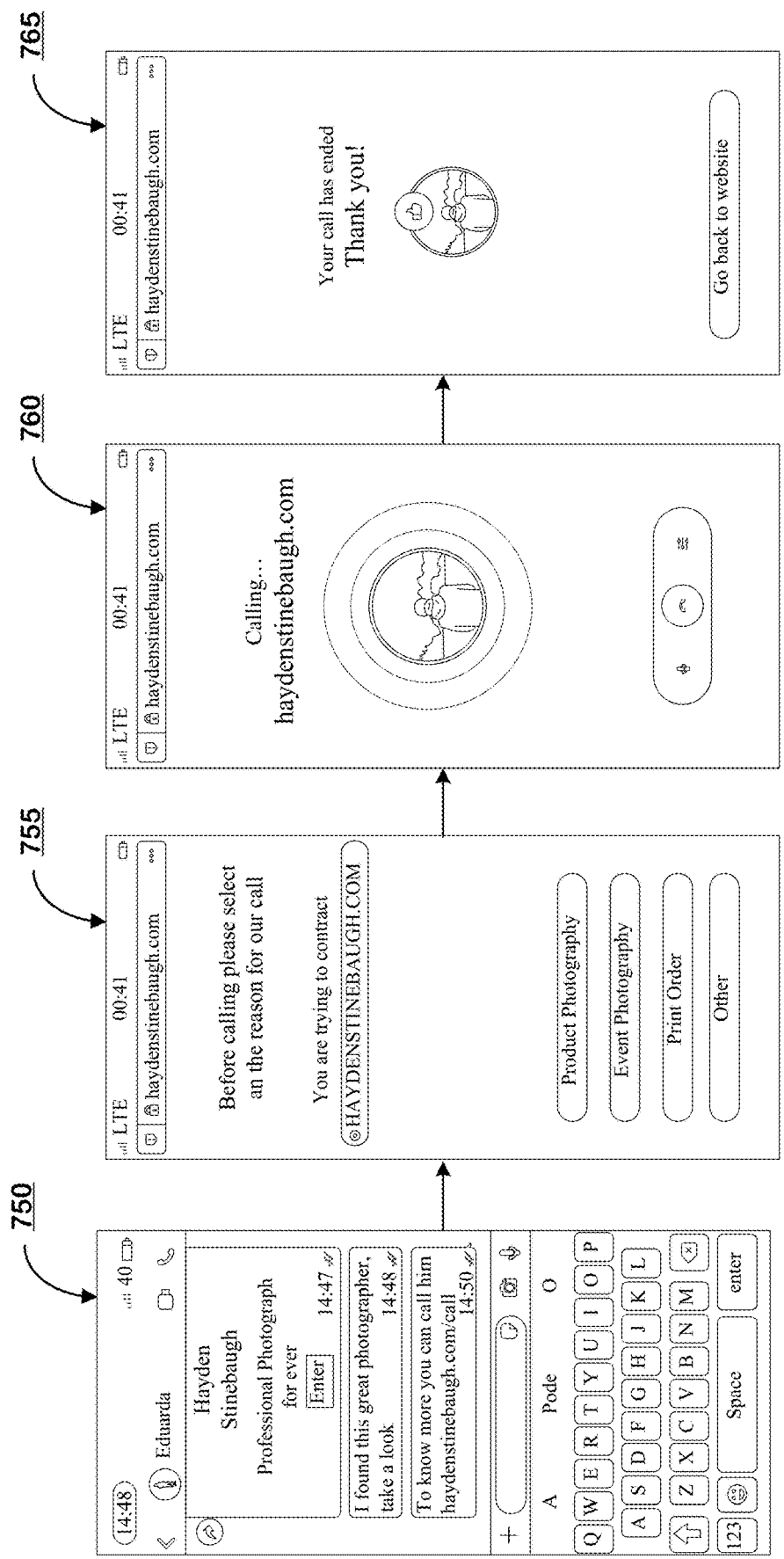

FIGS. 7A and 7B present an extension-to-call use case for the calling user. FIG. 7A presents a process flow including client-side (calling user side) operations presented in circles and server-side (domain communication server) operations in rectangles. The above applies to all of the following process flowcharts presented below. The calling user's device receives a selection input for extension-to-call link by the calling user (operation 701). The domain communication server 150 displays calling options on the calling user's device (operation 705). The calling user's device receives a selection for "print order" option from the calling page (operation 710). The domain communication server 150 initiates the call from the calling user's device to the called user (operation 715). The call is established when the called user accepts the call on the called user's device (operation 720). The calling user ends the call by selecting the end call button on the calling user's device upon completion of the call (operation 725). The domain communication server 150 ends the call between the calling user's device and the called user's device (operation 730).

FIG. 7B presents corresponding operations on the user interface on the calling user's side. The process starts when the calling user wants to call a photographer. To make the call, the calling user adds "/call" to the domain "photography-dude.com" as shown in a user interface 750 in FIG. 7B. On the social media page, the photographer has a "photographydude.com/call" as his professional contact. The caller starts the call anonymously to identified receiver. In one implementation, the domain communication server 150 assigns an evanescent domain to the calling user as described above with reference to FIG. 2A. A user interface 755 shows example calling options (product photography, event photography, print order, other) displayed on the called user's device in a web page (or the mobile app). A user interface 760 is displayed on the calling user's device when the calling user selects one of the calling options listed on the user interface 755 to communicate with the called user. A user interface 765 shows a user interface displayed on the calling user's device when the call ends.

The technology disclosed provides several advantages to both the calling users and the called user. For exampling, calling users do not like to lose time looking for contacts and typing numbers on their phones. The technology disclosed allows domain owners to add "/call" to the domain address. The calling users can then access the domain communication system on any computing device.

Called users such as small businesses owners, freelancers or other types of businesses do not need to buy an extra phone number to separate and manage professional/private information. By using the technology disclosed the users can do and receive calls on any device with internet access.

Click-to-Call

Figure 8A:
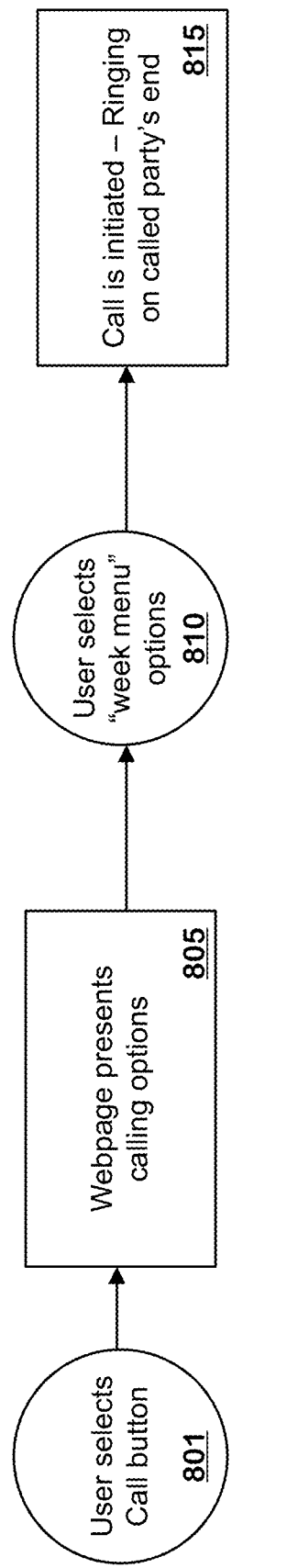
FIGS. 8A and 8B present a click-to-call use case for the calling user.
Figure 8B:
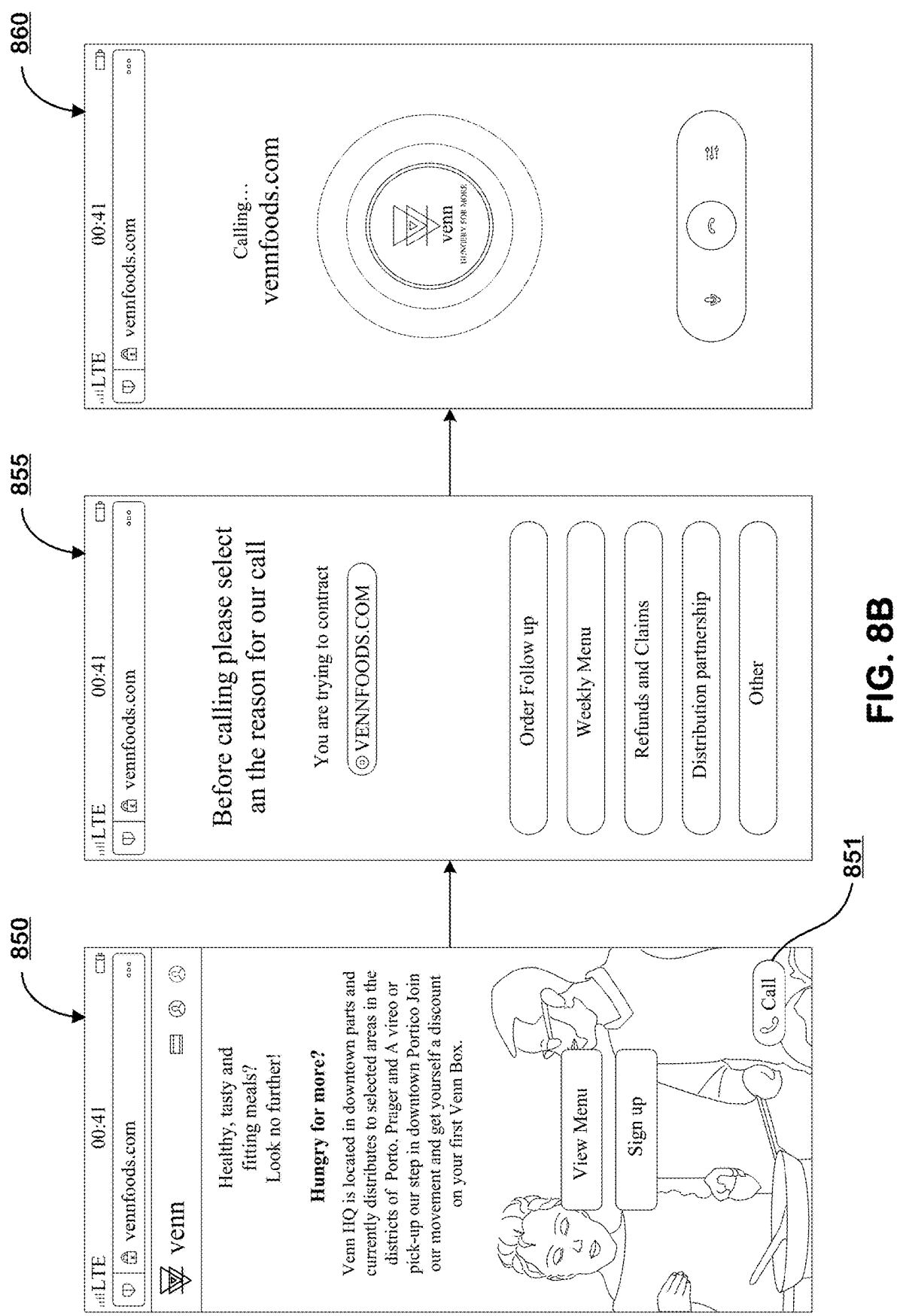

FIGS. 8A and 8B present a click-to-call use case for the calling user. When users want to call, they look for immediate contact. By selecting the "call" button, they can make the call and do not need to search for a phone number and type it on the phone. This use case illustrates a scenario when a calling user visits a web page and starts a call by clicking on the "call" button on the web page or an app running on a mobile device. The caller may initiate the call anonymously to identified receiver. FIG. 8A shows the process in which the calling user selects the "call" button on the web page (operation 801). The calling user's device receives the selection and communicates with the domain communication server 150. The domain communication server can present calling options on the calling user's device (operation 805). The calling user selects "weekly menu" option from the calling option (operation 810). The calling user's device sends the selected option to the domain communication server. The domain communication server initiates the call from the calling user's device to the called user's device (operation 815).

FIG. 8B presents example user interfaces displayed to the called user when above-listed operations are performed. A user interface 850 displays a call button 851 which can be selected by the calling user to call the business owner or a representative of the business. A user interface 855 shows five calling options including "order follow up", "weekly menu", "refunds and claims", "distribution partnership", and "other". The calling user can select a calling option to call the business. When the user selects one of calling options on the calling user's device, the domain communication server receives the selection from the calling user's device. The domain communication server 150 uses the selection to provide additional information to the called user on the called user's device as a reason for the call. Additional operations can be performed based on the selected call option such as re-directing the call to an appropriate person or a team in the business organization, etc. A user interface 860 is displayed to the calling user when the call is initiated by the domain communication server 150 from the calling user to the called user.

Schedule a Callback

Figure 9A:
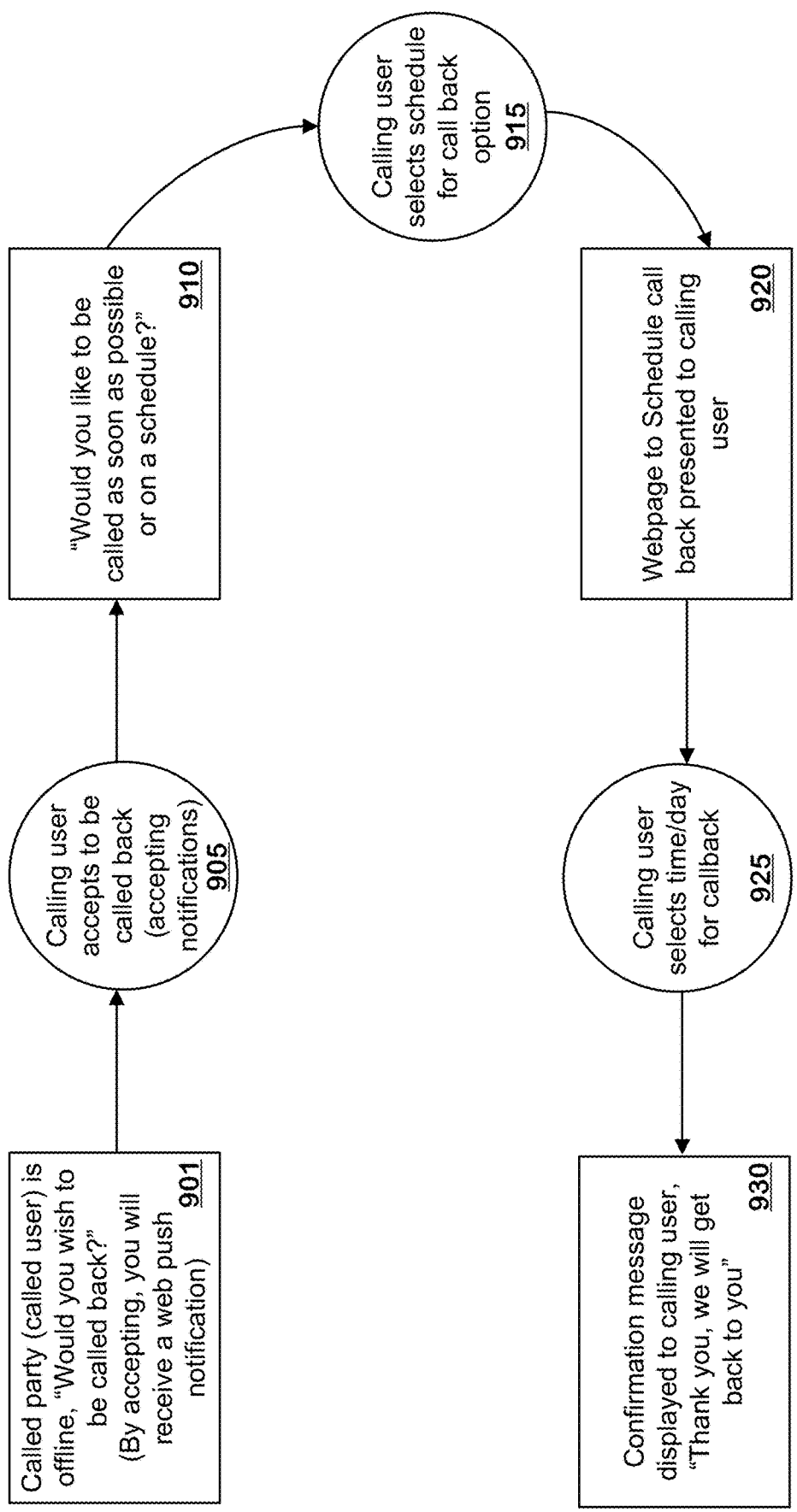
FIGS. 9A and 9B present a schedule callback use case for the calling user.
Figure 9B:
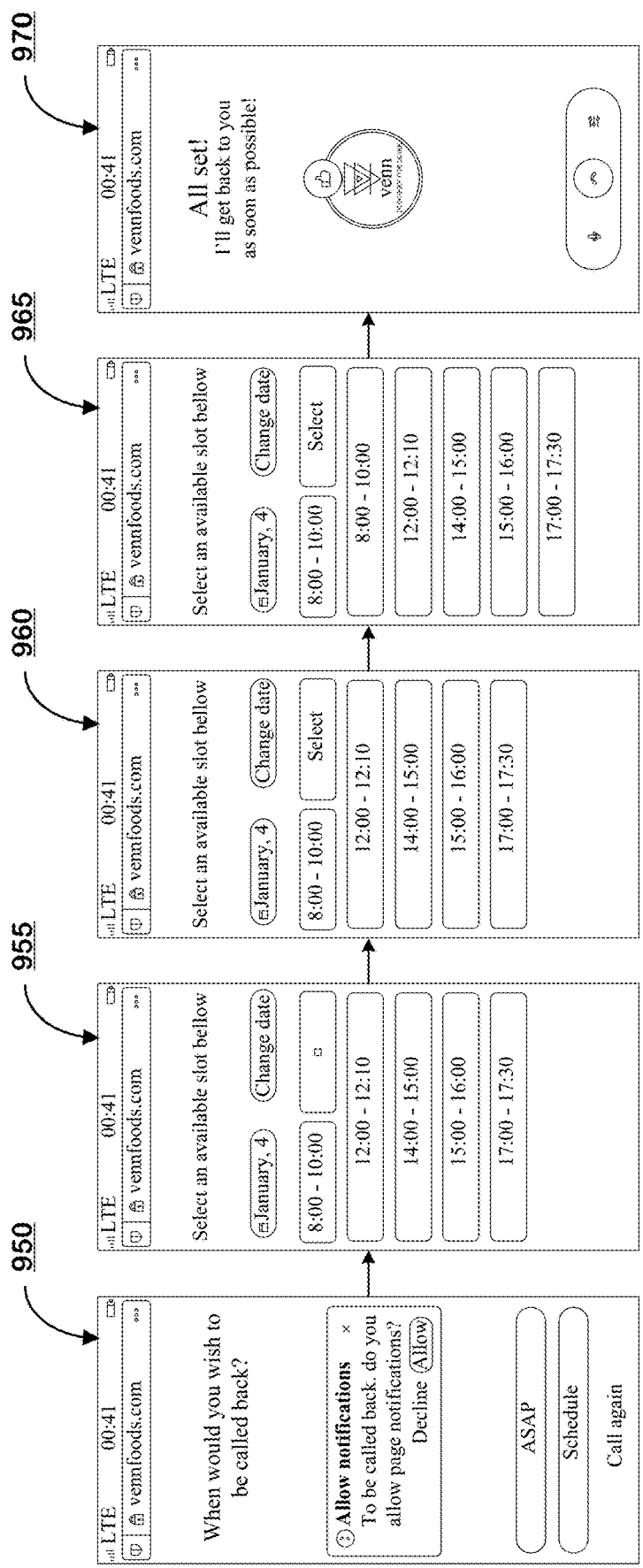

FIGS. 9A and 9B present a schedule callback use case for the calling user. Users do not like to feel ignored by businesses or other users whom they are attempting to call. When businesses are not online, they can use the technology disclosed to give an option to a calling user to schedule a callback. This feature can help calling users to feel that the business is providing support when they need it. In this use case a calling user tries to make a call but the call is not answered by the called user. The calling user chooses the alternative of scheduling a call.

FIG. 9A presents a process flow for the schedule a callback use case. The process starts when the calling user, using the calling user's device, attempts to call a business or another called user. The calling user's device receives a message from the domain communication server 150 that the "called party is offline, would you like to be called back?" (operation 901). The calling user can select the option presented on the calling user's device for callback from the called user (operation 905). The domain communication server 150 can present further callback options to the calling user on the calling user's device (operation 910). The callback options can include an option for a callback as soon as possible or callback on a schedule. The calling user can select one of the callback options presented on the calling user's device. If the calling user selects a callback on a schedule (operation 915), the domain communication server 150 can present a user interface on the calling user's device for selecting the schedule for callback (operation 920). The calling user can select a day and time from a calendar presented on the scheduling web page (operation 925). The domain communication server 150 displays a confirmation message on the calling user's device that the callback schedule is selected (operation 930).

FIG. 9B presents user interface examples for scheduling a callback. A user interface 950 on the calling user's device provides callback options "ASAP" or "Schedule" to the calling user. When the calling user selects the "Schedule" option, a user interface 955 is presented to the calling user on the calling user's device. The available callback times are listed for a particular date. The calling user can select one of the callback times or change the date to view callback times on another date. The calling user can scroll through the available time slots as shown in user interfaces 960 and 965 to select a convenient time for callback. When the calling user has selected a timeslot for callback, a confirmation message is displayed on the calling user's device as shown in a user interface 970. The technology disclosed therefore, enables the callings users to receive callback in a direct peer-to-peer communication when the called user is not available to take their call.

Select a Call Reason Before Calling

Figure 10A:
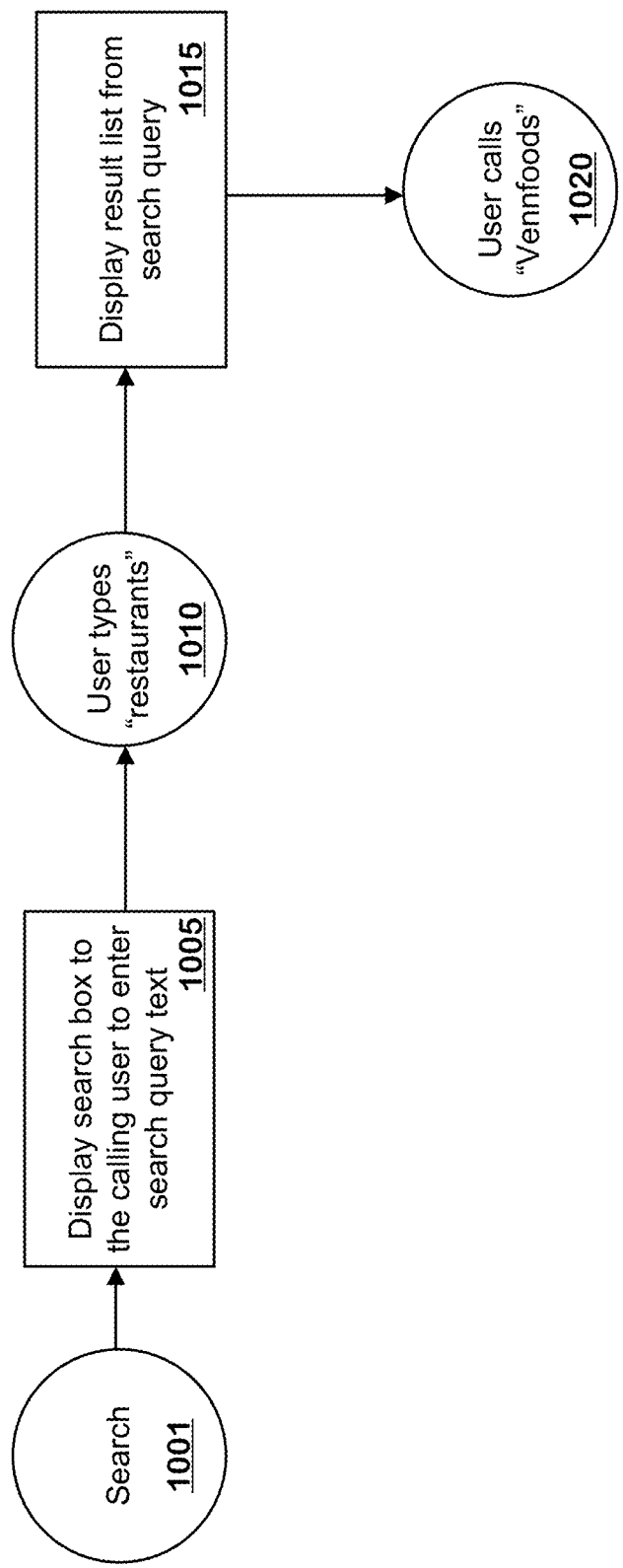
FIGS. 10A and 10B present a use case illustrating selection of a reason for callback before calling the called user.
Figure 10B:
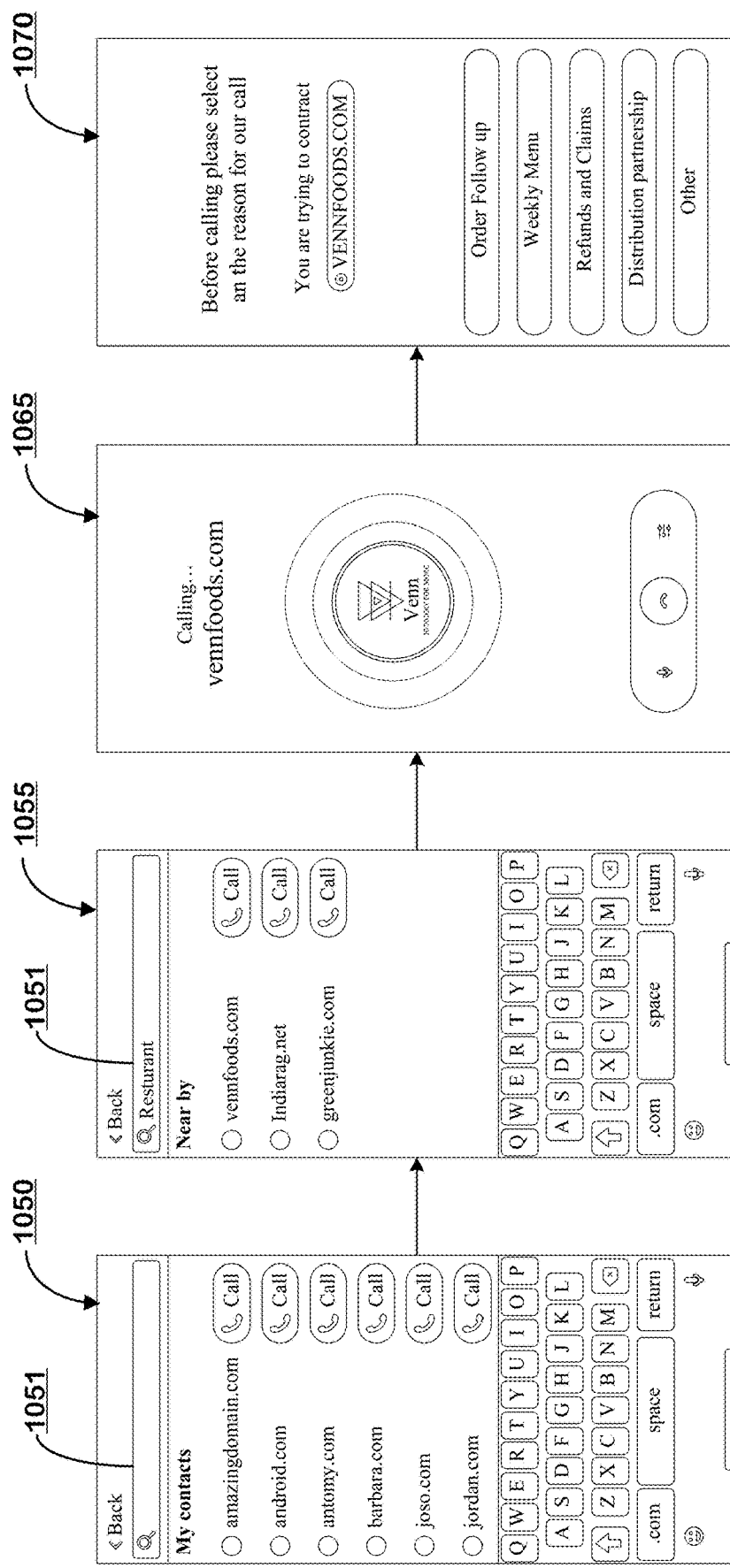

FIGS. 10A and 10B present a use case illustrating selection of a reason for callback before calling the called user. Consider a user wants to speak with a business such as a gym to ask for price information. The technology disclosed allows the calling user to select a reason for their call on the calling user's device. The calling user can access the web page for a business using the call button available on the web page. Before starting the call, the calling user can choose a call reason on a web page displayed on the calling user's device. Selecting a call reason helps the user define his context and feel that businesses with pre-call information will respond accordingly. The calling user's device can include the call reason when establishing the call with the called user via the domain communication server 150.

FIG. 10A presents the process which starts at an operation 1001 when the calling user's device initiates a search for a business using one or more keywords. The domain communication server 150 displays a search box on the calling user's device to enter search query text (operation 1005). The calling user enters the search keyword, e.g., "restaurants" in the search box displayed on the calling user's device (operation 1010). The domain communication server 150 displays the search results on the web page (operation 1015). The calling user selects a particular business from the search results and the calling user's device initiates the call to the selected business (operation 1020).

FIG. 10B presents user interface examples that can be used to search and call a business. A user interface 1050 presents a search text box 1051 on the calling user's device in which the calling user can enter search keywords. A user interface 1055 shows that the user has entered, "restaurants" search keyword in the search box 1051. The calling user can then select one search result from the list of search results displayed in the web page displayed on the calling user's device. A user interface 1065 shows that the calling user's device is establishing the call to the selected business. A user interface 1070 presents a list of reasons for the call to the selected business. The calling user can select one of the reasons listed on the web page. The called user's device will receive the reason of the call notification when the calling user's device initiates the call. The reasons can include, for example, "order follow up", "weekly menu", "refunds and claims", "distribution partnership", and "other". This helps the called user to improve the service delivery to their clients.

Search Services Contacts

FIGS. 10A and 10B present a use case for search services contacts before calling. A user is searching for a restaurant around his location. The user uses the search engine on the app to search for restaurants nearby and books a table. When looking for services, users need in the first place to search for businesses and then find the phone number. Using the domain communication system, the users can search businesses and make the call right away from the webpage or the app without requiring the phone number. The user interface 1055 presents the list of businesses on the calling user's device in response to the search query entered by the calling user in the search box 1051. The user can select a business from the search results displayed on the web page or the app running on the calling user's device.

Called Side or Called Side Use Cases

Further details of the called user or called side use cases are presented below.

Receive Push Notification on the Phone

Figure 11A:
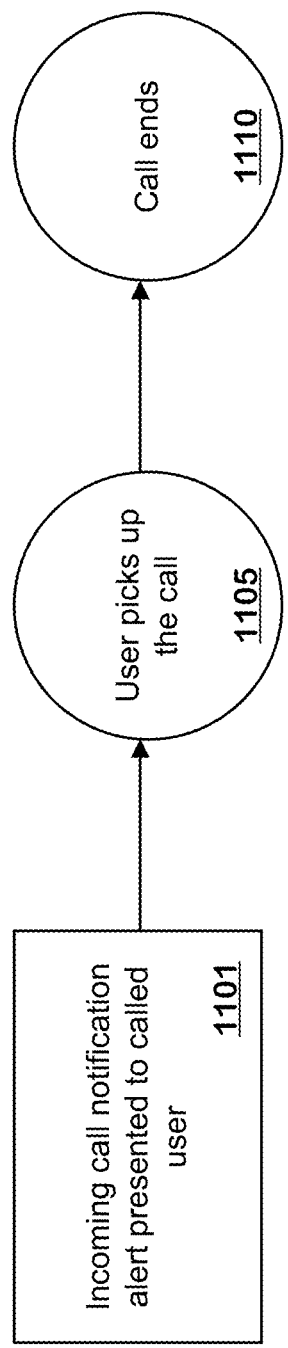
FIGS. 11A and 11B present a use case for receiving push notifications on the called user side.
Figure 11B:
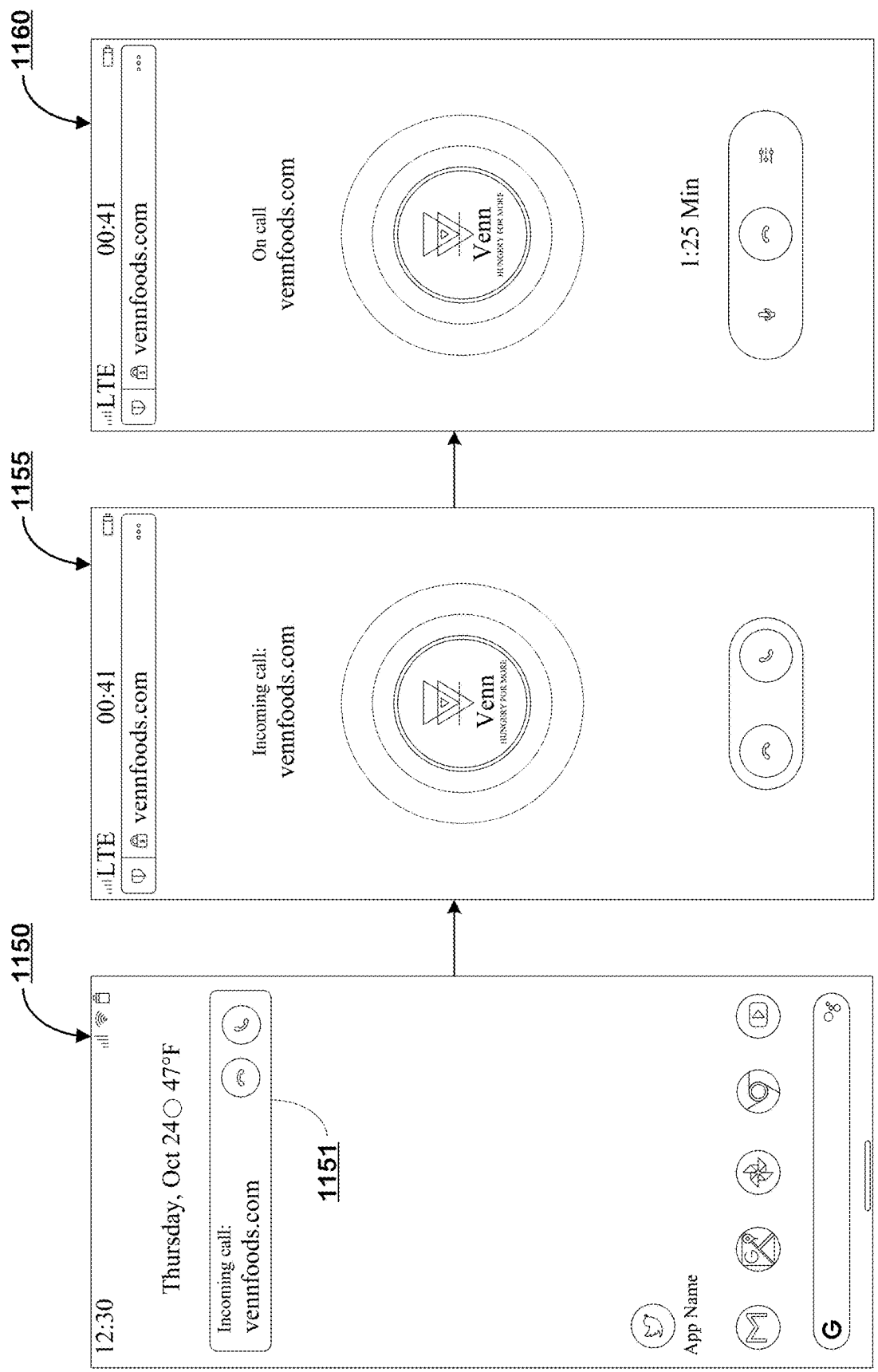

FIGS. 11A and 11B present a use case for receiving push notifications on the called user's device. For example, a shopper who tried to contact a business which did not answer, needs to be called back as soon as possible. By accepting push call notifications, the calling user's device (or shopper's device) can receive the call without providing any private or personal information. FIG. 11A presents a process for the receiving push notifications. Consider a business or called user is being called by a calling user or a shopper, the called user may not have the domain communication system app installed on their mobile device. The called user may have accepted push call notification before. The called user's device receives a push notification to accept the call (operation 1101). By selecting the notification, the user interface on called user's device is redirected to the web domain to take call, e.g., "easy.training/call" (operation 1105). The call is then established between the calling user's device and the called user's device. The calling user ends the call at an operation 1110 after completing the call.

FIG. 11B presents user interface examples for receiving the push notifications by the called user on the called user's device. A user interface 1150 shows a notification 1151 received on a mobile device of the called user. A user interface 1155 shows another notification received on the mobile device of the called user. The called user's device can receive any one or both of the notifications as shown in the user interfaces 1150 and 1151. A user interface 1160 shows that the called user has accepted the call from the calling user and is on the call.

Phone App Rings

Figure 12A:
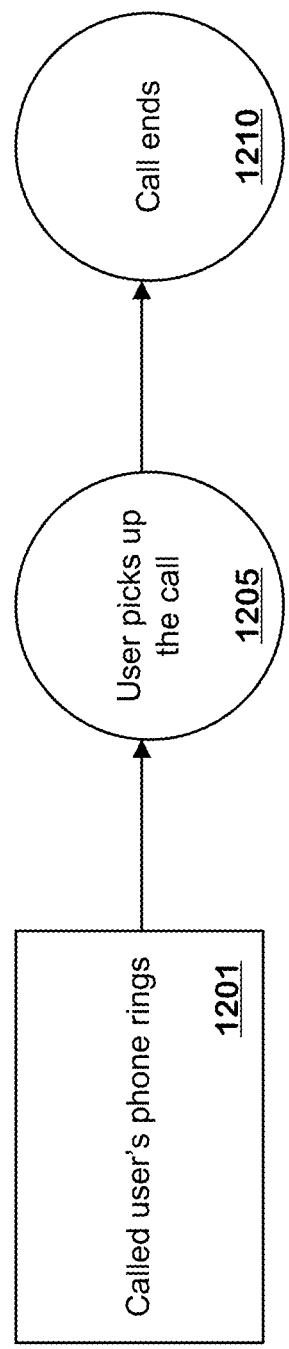
FIGS. 12A and 12B present a user for receiving a ring on the called user's phone.
Figure 12B:
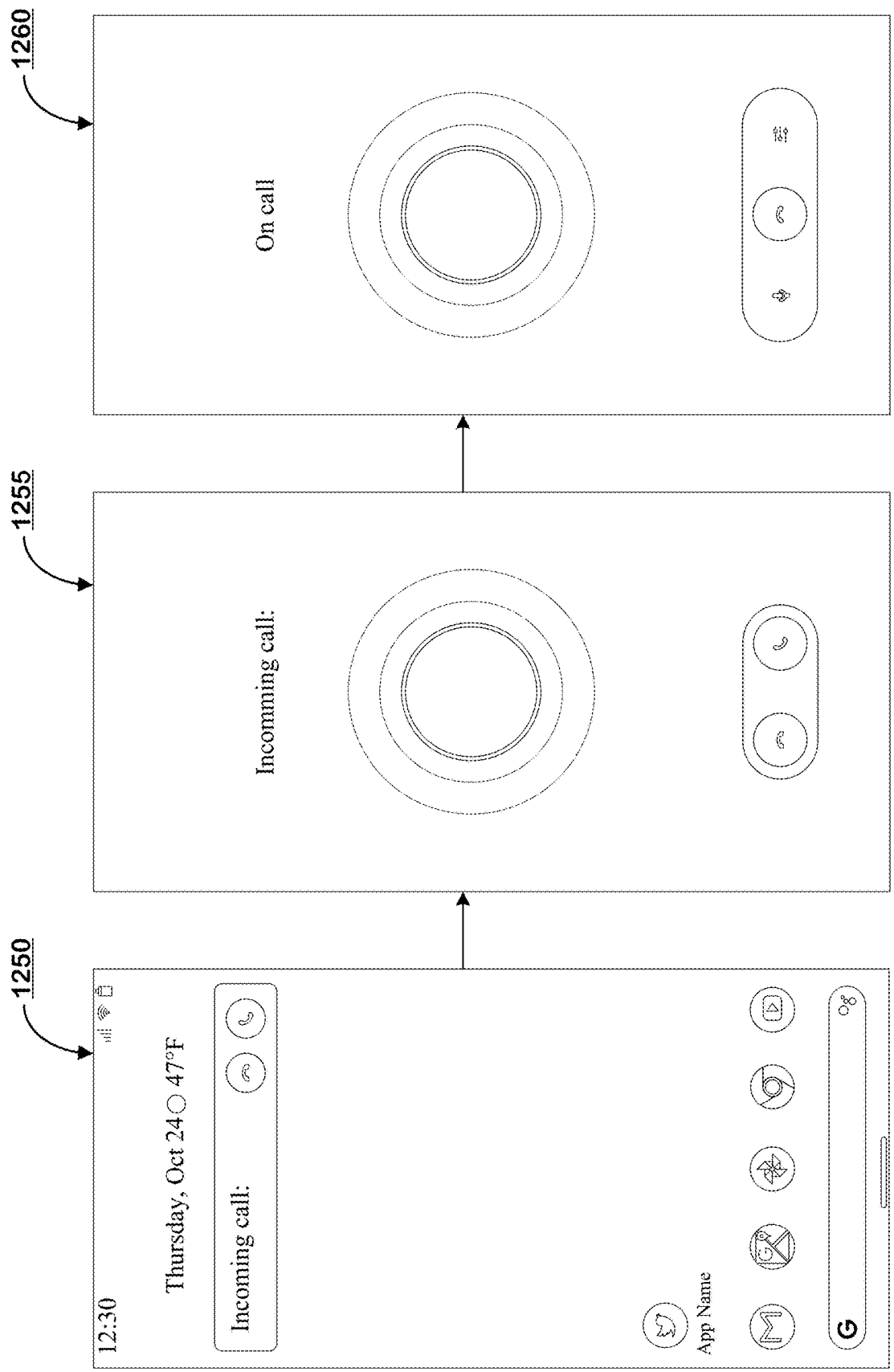

FIGS. 12A and 12B present receiving a ring on the called user's phone use case. For example, consider a business owner who manages the business communication and needs to be accessible to his clients. By having the app installed, the business owner can manage his availability and all the incoming communication from one single point of communication. FIG. 12A presents a process flow for this use case. The process starts when a called user's phone rings upon receiving a direct peer-to-peer call from a calling user (operation 1201). The called user has installed the app, a calling user calls his domain (ex: easytraining.com/call), and the app rings on the phone of the called user. The called user picks up the phone and answers the call (operation 1205). The called user ends the call after talking to the calling user (operation 1210). FIG. 12B presents user interface diagrams for phone app ringing use case. The called user's phone (or mobile device) receives an incoming call notification (or alert) as shown in a user interface 1250. The phone starts ringing as shown in a user interface 1255. The called user takes the call as shown in a user interface 1260.

Receives Call on the Desktop Computer

Figure 12C:
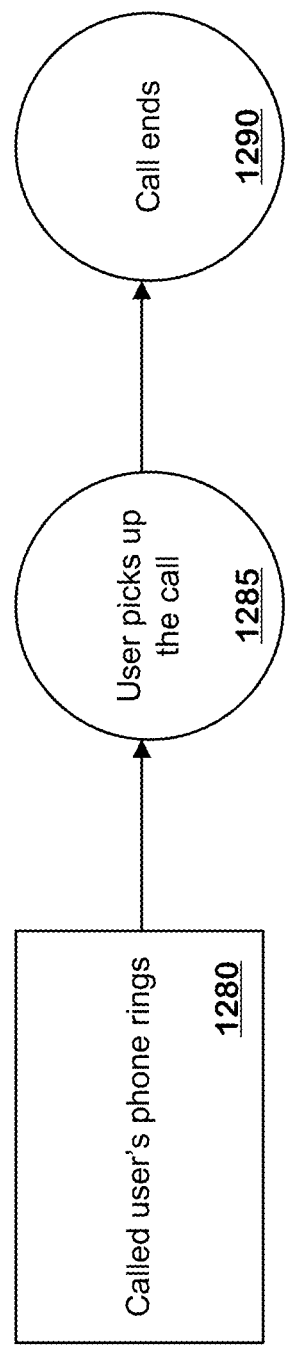
FIG. 12C presents receiving a ring on a desktop/laptop computer use case on the called user side.

FIG. 12C presents receiving a ring on a desktop/laptop computer use case on the called user's side. A called user is being called by a calling user, but the called user performs most of his day-to-day operations on the desktop computer. It would be convenient if he can receive his calls on the desktop computer. The technology disclosed enables this use case. The incoming call rings on the desktop computer (operation 1280), and the called user picks up the call from his desktop and/or laptop computer (operation 1285). The called user can end the call after talking to the calling user (operation 1290). Preferred interfaces to communicate can vary depending on the context of each user. By having an omnichannel solution, users can pick up calls from wherever they prefer without affecting the availability and quality of the call.

Receives Pre-Call Information

Figure 13A:
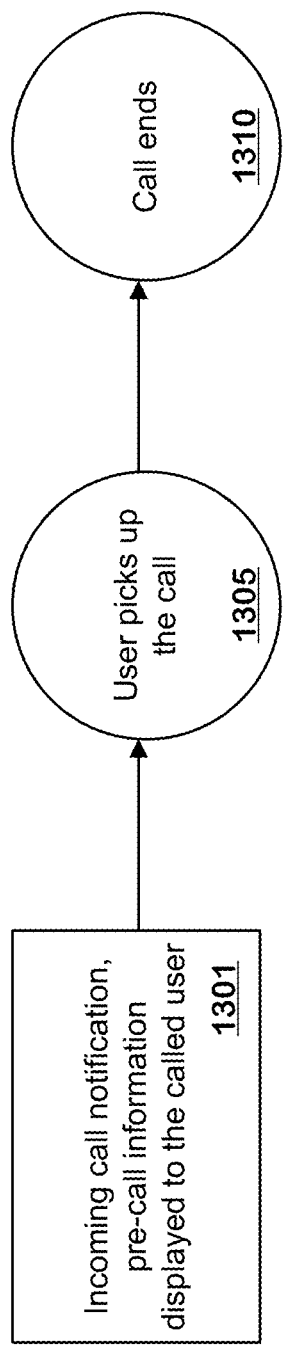
FIGS. 13A and 13B present a use case for receiving an incoming call notification that includes a reason for the call.
Figure 13B:
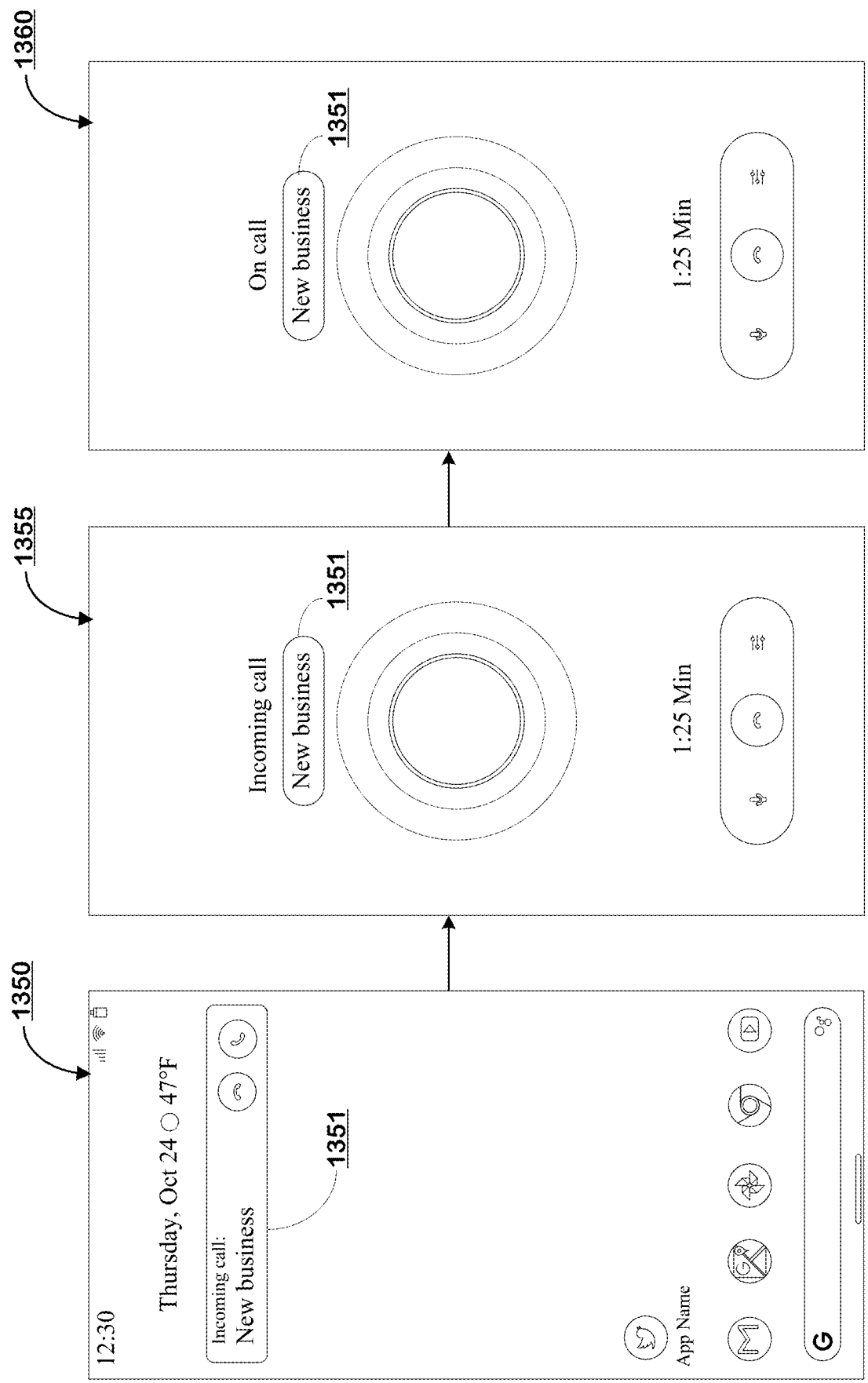

FIGS. 13A and 13B present a use case for receiving an incoming call notification that includes a reason for the call. FIG. 13A presents a process flowchart including operations performed by the domain communication server 150 and the client side computing device. A called user's device is being called by a calling user's device, and in the incoming call a pre-selected information submitted by the caller is on display of the called user's computing device (operation 1301). This pre-selected information is part of the process when choosing to call (e.g., when calling "easytraining.com/call", the calling user can choose between calling options such as "new training", "complaint", or "price information", etc.). The called user picks up the phone (operation 1305). The called user ends the call after talking to the calling user (operation 1310). This use case is helpful when a business employee needs to know why someone is calling, in order to better manage the time and effort he puts into each call.

FIG. 13B presents example user interfaces that depict the reason for an incoming call to a called user. A user interface 1350 shows a call being received at the mobile of the called user with a reason for the call displayed in the incoming call notification or the incoming call alert 1351. A user interface 1355 shows another view in which the reason for the call 1351 is displayed with the incoming call notification on the mobile device of the called user. A user interface 1360 shows the reason of the call 1351 displayed on the user interface of the called user's mobile device during the call with the calling user.

Receive Schedule Information

Figure 14A:
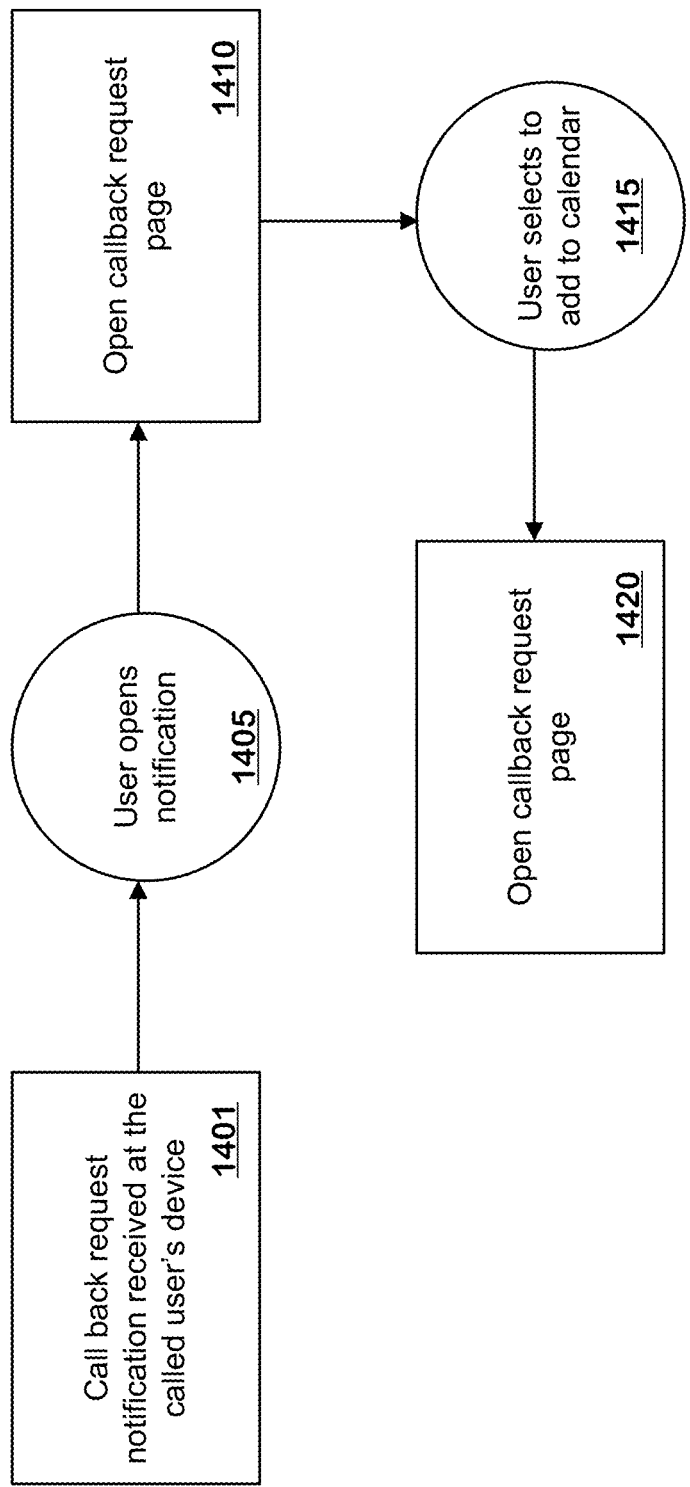
FIGS. 14A and 14B present a use case for receiving a schedule information for callback to the calling user.
Figure 14B:
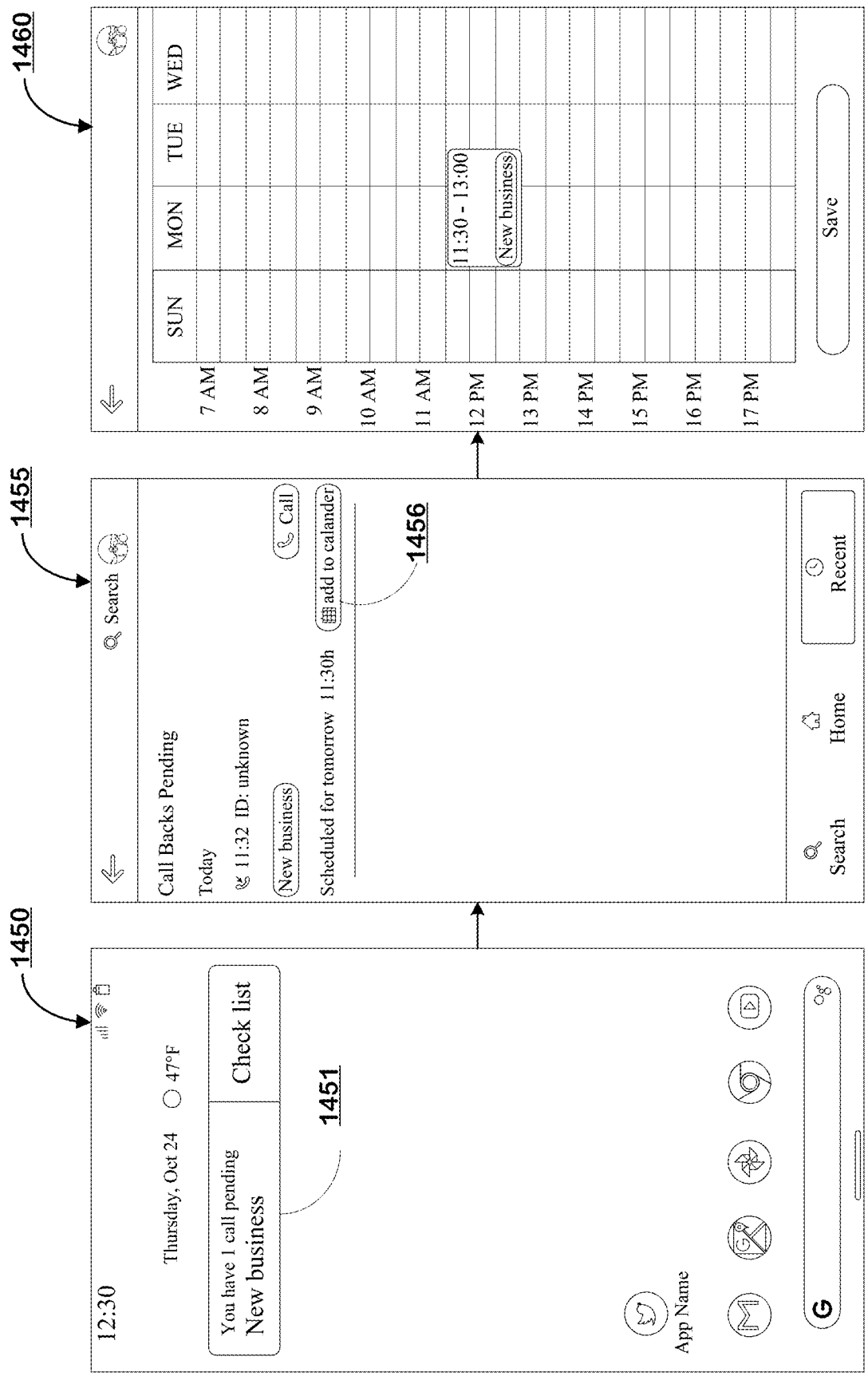

FIGS. 14A and 14B present a use case for receiving a schedule information on the called user's device for callback to the calling user. This feature is helpful when a business wants to be available for as much time as possible and needs to provide active solutions that meet clients' needs. This helps the businesses to retains their clients and not lose possible business leads.

FIG. 14A presents a flowchart with operations performed by the called user's computing device and the domain communication server 150. A user is being called by the caller, but at the moment he is offline and cannot pick up the call. The calling user has the choice to choose between some pre-selected options on a schedule. This will inform the called user, the preferred time when the calling user wishes to be called back. Suppose the calling user provided a schedule for call back using the calling user's device. The called user receives a notification on the called user's device from the domain communication server 150 that the calling user has sent in a schedule for callback (operation 1401). The called user's device opens the notification for presenting the details of the callback schedule information (operation 1405). The domain communication server 150 presents the callback information on a callback request web page displayed on the called user's device (operation 1410). The called user selects the callback schedule to a calendar (operation 1415). The domain communication server 150 opens callback request web page on the called user's device to allow the called user to add the callback schedule to the calendar (operation 1420).

FIG. 14B presents user interfaces that implement the receiving callback schedule information. A user interface 1450 shows a notification 1451 received at the called user's mobile device. The called user can select the notification and open the notification to view details. A user interface 1455 shows the view displayed on the called user's device when the called user opens the notification. The notification shows that a callback is scheduled for tomorrow at 11:30h (or 11:30 AM). The called user can select "add to calendar" button 1456 to add the scheduled callback to her calendar. A user interface 1460 shows a calendar view displayed on the mobile device of the called user in response to selection of the "add to calendar" button 1456 in the user interface 1455. The scheduled callback is now placed on the calendar for the called user.

Back Office Receives Call and Redirects to a Team Member

Figure 15A:
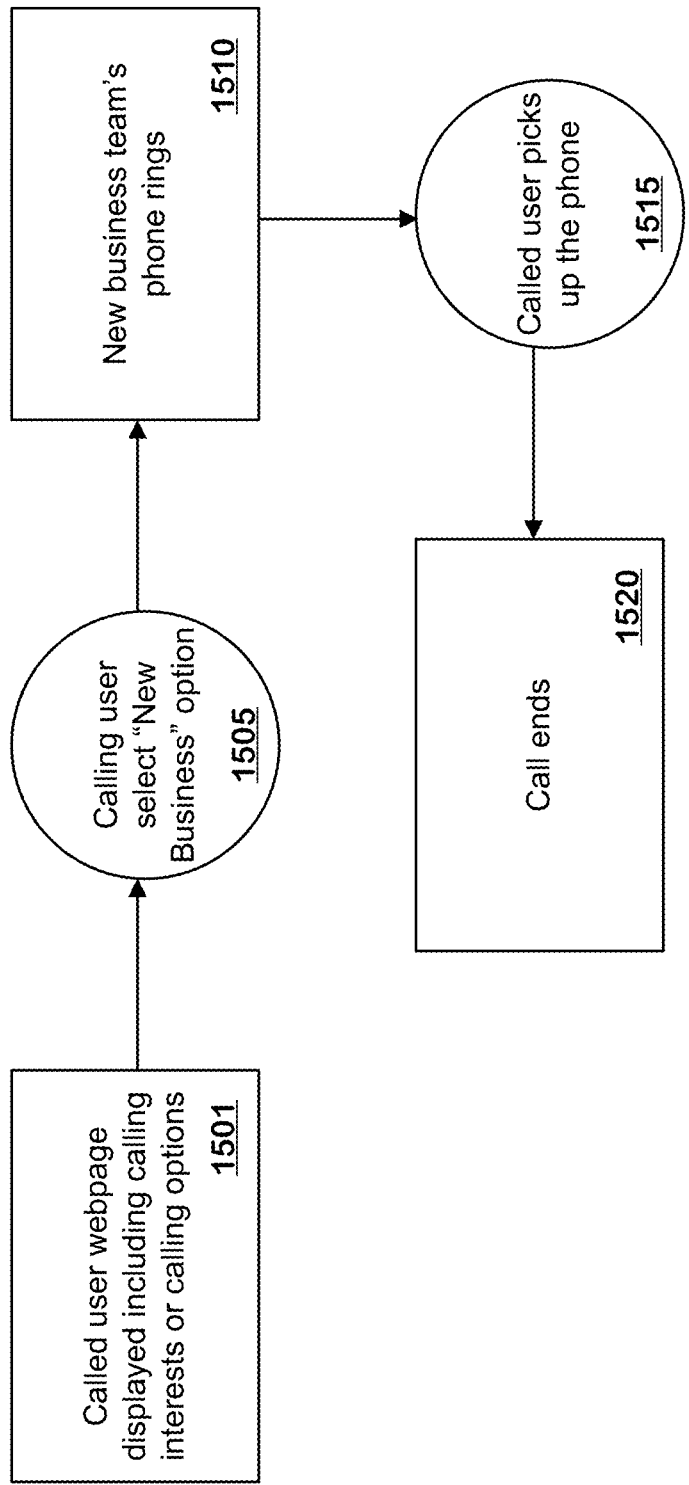
FIGS. 15A and 15B present a use case for receiving a call by a team at a business and redirecting the call to a relevant member of the team based on a reason of the call.
Figure 15B:
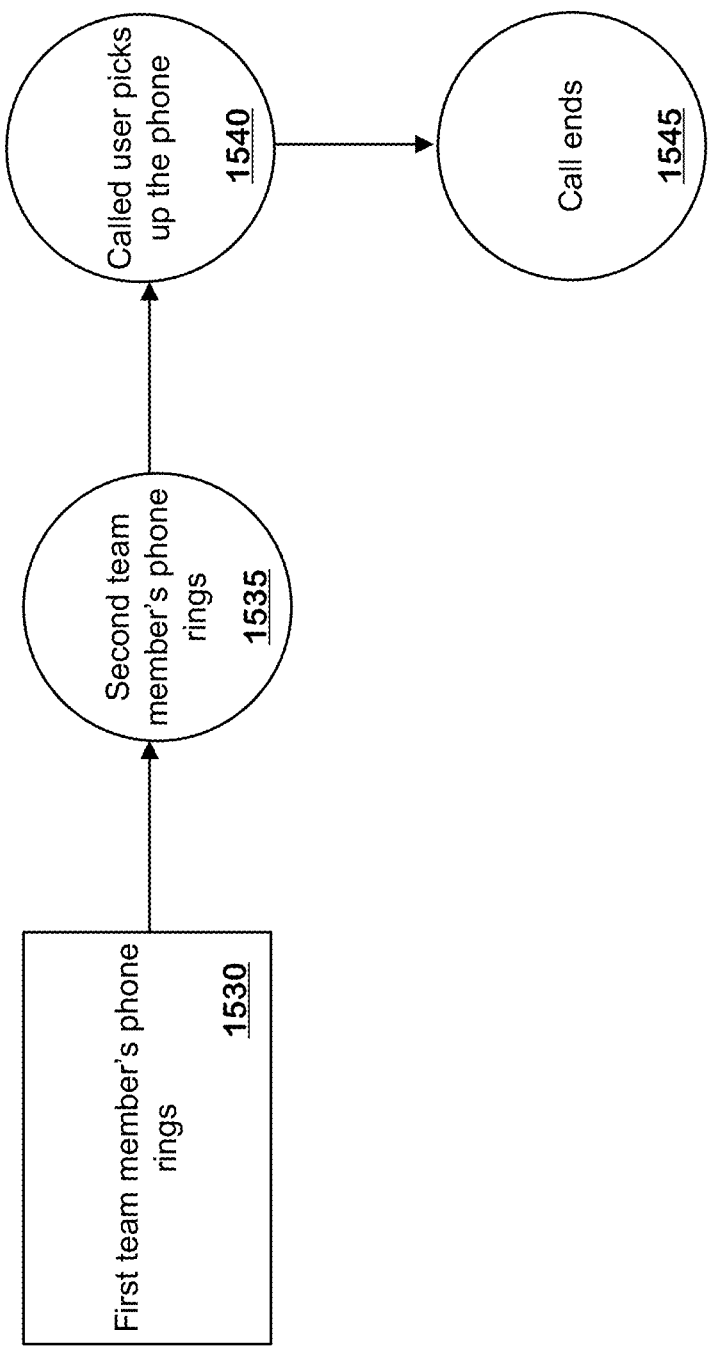

FIGS. 15A and 15B present a use case for receiving a call by a team at a business and redirecting the call to a relevant member of the team based on a reason of the call. For example, consider a business is being called by a calling user. The incoming calls at this business are managed by a team including multiple team members. The technology disclosed includes logic to transfer the call to an appropriate team member based on a reason of the call included in the notification received with the call. The calling user during the pre-call has selected a specific topic and is redirected to the team member responsible to pick up calls for that specific topic.

FIG. 15A presents a process flowchart that includes operations performed to direct the call to an appropriate team member's device. The process starts at an operation 1501 when a calling user tries to call a business (or a called user) using the calling user's device. The domain communication server 150 displays a web page on the calling user's device that includes the various topics, calling reasons, etc. from which the calling user can select at least one reason or topic for the call (operation 1501). The calling user selects "new business" reason from the list of calling reasons on the web page for the called user (operation 1505). The domain communication server establishes a connection of the calling user's device with the called user's device. Based on the reason of the call selected, the call is directed to the new business team's domain and thus the new business team's mobile phone or desktop computer starts ringing (operation 1510). In one implementation, the business being called by the calling user's device includes multiple team members that form a team. In this implementation, the business has no pre-call process in place, and every team member can pick up incoming calls using their respective device. In this implementation, all the members devices ring for the incoming call, and the first one to be available to pick up is the one who answers (operation 1515). In another implementation, the business implements pre-call assist feature provided by the technology disclosed. In this implementation, when a business has multiple employees and each employee is specialized in a specific topic. The business needs to manage resources and reduce waiting time for callers, in order to improve customer experience. In this implementation, the business can register several subdomains that are specialized for specific topics. The incoming calls are matched to the subdomain that matches the call reason or call topic selected by the calling user in operation 1505. The subdomains are then assigned to specialized team members that handle incoming calls related to that topic. In this implementation, the incoming calls are therefore, directed to specific team member's device that specialize in that topic. Therefore, all team members do not receive all incoming calls on their respective devices. In this implementation, the technology disclosed enables businesses to provide efficient services to their clients by automatically re-directing incoming calls to devices of respective team members with specialized knowledge about the call reason or topic selected by the calling user. In one implementation, the technology disclosed can implement a trained machine learning model to process information from an incoming call such as pre-call information text to classify the incoming call to one of multiple pre-defined categories of incoming calls. The classification of the incoming call (i.e., the category) is then used to assign the incoming call to a customer support representative's device who specializes in that category.

FIG. 15B presents a process flowchart for another implementation in which a call can be redirected by a first user's device to another user's device based on a reason for a call. A first user's phone rings when an incoming call is received (operation 1530). The first user can redirect the call to a second user therefore causing the second user's phone to ring (operation 1535). The second user picks up the call (operation 1540). The process ends when the call ends at an operation 1545.

Receives Message with the Call Request

Figure 15C:
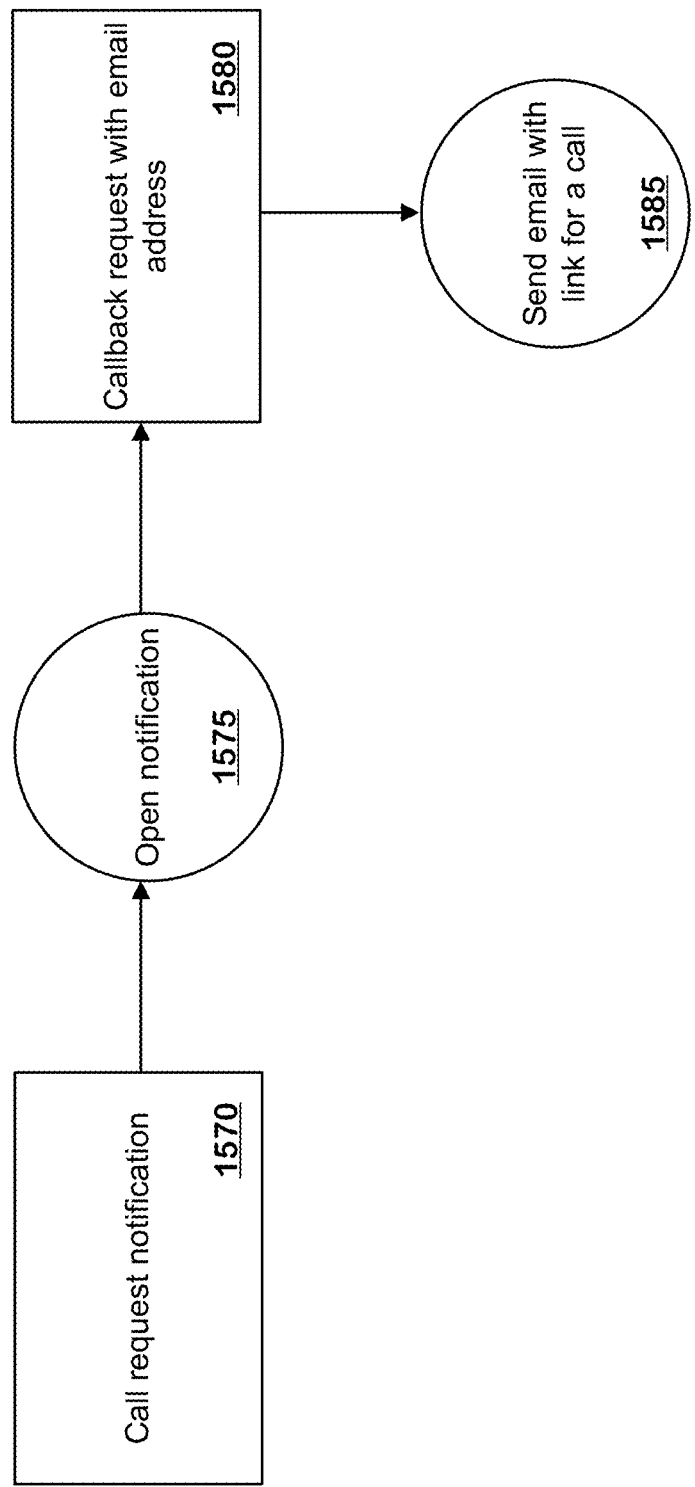
FIG. 15C presents a use case in which the calling user sends an email address in the callback request to the called user.

FIG. 15C presents a use case in which the calling user sends an email address in the callback request when the called user cannot take the calling user's call. The called user's device was offline when the calling user tried to call the called user. The called user's device receives a message with a request for a call with a domain name. This feature is helpful when a user who tried to contact a business but the business did not answer. The calling user wishes to be called back but does not accept push call notifications. By introducing an email for follow-up, the business can send an email message or a text message with a link for a call.

FIG. 15C presents the process for receiving a callback notification with an email address of the calling user. The process starts when the called user's device receives a notification for callback request (operation 1570). The called user opens the notification on the called user's device at an operation 1575. The notification contains a callback request with an email address (operation 1580). The called user then sends an email, using the called user's device, to the calling user at the email address in the callback notification with a link (such as a URL) for the call with the called user (operation 1585).

Computer Implementation

Figure 16:
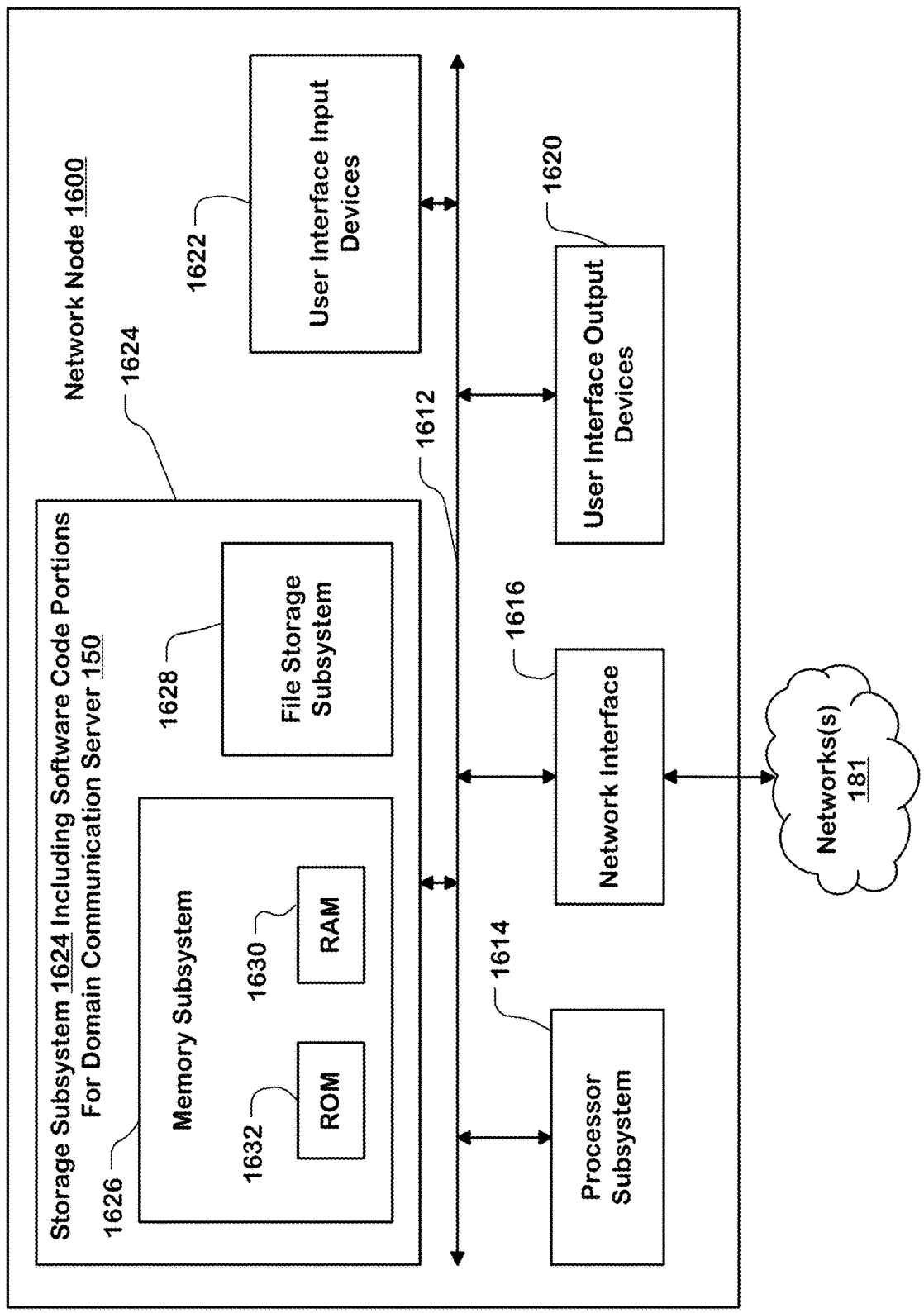
FIG. 16 is a simplified block diagram of a computer system that can be used to implement the domain communication system presented in FIG. 1.

A computer-implemented method implementation of the technology disclosed includes Computer System as shown in FIG. 16.

FIG. 16 is a simplified block diagram of a computer system 1600 that can be used to implement domain communications. Computer system 1600 includes at least one central processing unit (CPU) as part of the processor subsystem 1614 that communicates with a number of peripheral devices via bus subsystem 1612. These peripheral devices can include a storage subsystem 824 including, for example, memory devices 1626 and a file storage subsystem 1628, user interface input devices 1622, user interface output devices 1620, and a network interface subsystem 1616 The input and output devices allow user interaction with computer system 1600. Network interface subsystem 1616 provides an interface to outside networks, including an interface to corresponding interface devices in other computer systems.

In one implementation, the domain communication server 150 of FIG. 1 is communicably linked to the storage subsystem 1624 and the user interface input devices 1622. In one implementation, at least a portion of the software code program implementing the domain communication server 150 may reside in the storage subsystem 1624.

User interface input devices 1622 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1600.

User interface output devices 1620 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1600 to the user or to another machine or computer system.

Storage subsystem 1624 stores programming and data constructs that provide the functionality of some or all of the modules and methods described herein. The computer system can include graphics processing units (GPUs) or field-programmable gate arrays (FPGAs).

Memory subsystem 1626 used in the storage subsystem 1600 can include a number of memories including a main random access memory (RAM) 1630 for storage of instructions and data during program execution and a read only memory (ROM) 1632 in which fixed instructions are stored. A file storage subsystem 1628 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1628 in the storage subsystem 1624, or in other machines accessible by the processor.

Bus subsystem 1612 provides a mechanism for letting the various components and subsystems of computer system 1600 communicate with each other as intended. Although bus subsystem 1612 is shown schematically as a single bus, alternative implementations of the bus subsystem can use multiple busses.

Computer system 1600 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1600 depicted in FIG. 16 is intended only as a specific example for purposes of illustrating the preferred embodiments of the present disclosed technology. Many other configurations of computer system 1600 are possible having more or less components than the computer system depicted in FIG. 16.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™, Truviso™, Amazon Elasticsearch Service™, Amazon Web Services™ (AWS), IBM Info-Sphere™, Borealis™, and Yahoo! S4™.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A method for conducting direct peer-to-peer real time communications, comprising a domain communication server performing actions including:
    receiving a request on behalf of a first user, to initiate a direct peer-to-peer communication session specifying a domain name of a second user; wherein the second user is a registered and authorized user having the domain name registered with a domain name server and authorized by the domain communication server to participate in the direct peer-to-peer real time communication using the domain name to conduct the direct peer-to-peer real time communications with other users;
    initiating, the direct peer-to-peer communication session between the first user and the second user;
    if the domain communication server determines that the first user is unauthorized:
        generating for the first user (i) an evanescent domain name, that expires after a pre-defined duration, registered on behalf of the first user with the domain name server, and (ii) an authorization by sending an authorization code that was generated with a pseudo-random number to the first user for creating an authorization record with the domain name server wherein the authorization record includes the authorization code; and
        authorizing the first user based upon the evanescent domain name, when the authorization code in the authorization record of the first user with the domain name server matches the authorization code sent to the first user; otherwise, if the domain communication server determines the first user is authorized:

using the domain name of the first user to conduct the direct peer-to-peer communication session without generating an evanescent domain name for the first user;

generating a call identifier for the direct peer-to-peer communication session between the first user and the second user;

offering to the second user based upon the domain name specified in the received request, to initiate direct peer-to-peer communications with the first user; wherein the offering includes sending the call identifier to the second user for acceptance of the direct peer-to-peer communication session with the first user and upon an indication of acceptance from the second user, sending the call identifier to the first user; and completing setup of the direct peer-to-peer communication session.

2. The method of claim 1, wherein the domain name of the second user is an address string that identifies an Internet Protocol resource such as a server to access services provided by the server on behalf of the second user.

3. The method of claim 1, further including: implementing customer relationship management (CRM) functionality that identifies the first user to the second user based upon the domain name registered with the domain name server and providing to the second user, user information of the first user; wherein the user information includes at least one of a username, user address, date and time of a last communication with the first user, and any products and services purchased by the first user.

4. The method of claim 1, further including implementing a pre-call assistant that indicates to the second user an intent of the call.

5. The method of claim 1, further including the domain communication server removing expired domain name records.

6. The method of claim 1, wherein the received request includes a request to conduct a voice call.

7. The method of claim 1, wherein the received request includes a request to conduct a video call.

8. The method of claim 1, wherein the received request includes a request to conduct a data call.

9. The method of claim 1, wherein the received request includes a request to conduct messaging.

10. The method of claim 1, wherein authorizing, by the domain communication server, users to participate in the direct peer-to-peer real time communications using the domain name further includes authorizing users to conduct (i) initiating direct peer-to-peer real time communications; and (ii) receiving direct peer-to-peer real time communications.

11. The method of claim 1, further including implementing a schedule function enabling the direct peer-to-peer real time communications to be scheduled.

12. The method of claim 1, further including implementing an Out-of-office mode thereby enabling the second user to establish availability to attend calls.

13. The method of claim 1, further including implementing a reward system for users that compensates for waiting in picking up calls, by: tracking wait times using a timer started upon receipt of an incoming call and stopped upon initiating the direct peer-to-peer communication session; determining a reward; and providing the reward to a waiting user.

14. The method of claim 1, wherein the request is received via a first instance of a web page.

15. The method of claim 14, wherein offering to initiate direct peer-to-peer communications with the first user is offered via at least one of (i) a second instance of a web page and (ii) a first instance of a mobile application.

16. The method of claim 1, wherein the request is received via a first instance of a mobile application.

17. The method of claim 16, wherein offering to initiate direct peer-to-peer communications with the first user is offered via at least one of: (i) a second instance of a mobile application and (ii) a first instance of a web page.

18. A non-transitory computer-readable storage medium storing instructions for conducting direct peer-to-peer real time communications, which instructions when executed by at least one processor, implement a domain communication server that performs actions of:

receiving a request on behalf of a first user, to initiate a direct peer-to-peer communication session specifying a domain name of a second user; wherein the second user is a registered and authorized user having the domain name registered with a domain name server and authorized by the domain communication server to participate in the direct peer-to-peer real time communication using the domain name to conduct the direct peer-to-peer real time communications with other users;

initiating, the direct peer-to-peer communication session between the first user and the second user;

if the domain communication server determines that the first user is unauthorized:

generating for the first user (i) an evanescent domain name, that expires after a pre-defined duration, registered on behalf of the first user with the domain name server, and (ii) an authorization by sending an authorization code that was generated with a pseudo-random number to the first user for creating an authorization record with the domain name server wherein the authorization record includes the authorization code; and authorizing the first user based upon the evanescent domain name, when the authorization code in the authorization record of the first user with the domain name server matches the authorization code sent to the first user; otherwise, if the domain communication server determines the first user is authorized:

using the domain name of the first user to conduct the direct peer-to-peer communication session without generating an evanescent domain name for the first user;

generating a call identifier for the direct peer-to-peer communication session between the first user and the second user;

offering to the second user based upon the domain name specified in the request, to initiate direct peer-to-peer communications with the first user; wherein the offering includes sending the call identifier to the second user for acceptance of the direct peer-to-peer communication session with the first user and upon an indication of acceptance from the second user, sending the call identifier to the first user; and completing setup the direct peer-to-peer communication session.

19. A data processing system comprising a domain communication server including at least one processor coupled with a computer-readable storage medium storing instructions for conducting direct peer-to-peer real time communications, which instructions when executed by the at least one processor perform:

receiving a request on behalf of a first user, to initiate a direct peer-to-peer communication session specifying a domain name of a second user; wherein the second user is a registered and authorized user having the domain name registered with a domain name server and authorized by the domain communication server to participate in the direct peer-to-peer real time communication using the domain name to conduct the direct peer-to-peer real time communications with other users;

initiating, the direct peer-to-peer communication session between the first user and the second user;

if the domain communication server determines that the first user is unauthorized:
    generating for the first user (i) an evanescent domain name, that expires after a pre-defined duration, registered on behalf of the first user with the domain name server, and (ii) an authorization by sending an authorization code that was generated with a pseudo-random number to the first user for creating an authorization record with the domain name server wherein the authorization record includes the authorization code, and;
    authorizing the first user based upon the evanescent domain name, when the authorization code in the authorization record of the first user with the domain name server matches the authorization code sent to the first user; otherwise, if the domain communication server determines the first user is authorized:
    using the domain name of the first user to conduct the direct peer-to-peer communication session without generating an evanescent domain name for the first user;

generating a call identifier for the direct peer-to-peer communication session between the first user and the second user;

offering to the second user based upon the domain name specified in the request, to initiate direct peer-to-peer communications with the first user; wherein the offering includes sending the call identifier to the second user for acceptance of the direct peer-to-peer communication session with the first user and upon an indication of acceptance from the second user, sending the call identifier to the first user; and completing setup of the direct peer-to-peer communication session.

* * * * *